US 11,494,555 B2

(12) United States Patent
Bellert

(10) Patent No.: US 11,494,555 B2
(45) Date of Patent: Nov. 8, 2022

(54) IDENTIFYING SECTION HEADINGS IN A DOCUMENT

(71) Applicant: Konica Minolta Business Solutions U.S.A., Inc., San Mateo, CA (US)

(72) Inventor: Darrell Bellert, Boulder, CO (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 463 days.

(21) Appl. No.: 16/675,456

(22) Filed: Nov. 6, 2019

(65) Prior Publication Data

US 2020/0320170 A1 Oct. 8, 2020

Related U.S. Application Data

(63) Continuation-in-part of application No. 16/370,724, filed on Mar. 29, 2019.

(51) Int. Cl.
*G06F 40/205* (2020.01)
*G06V 30/414* (2022.01)
*G06V 30/416* (2022.01)
*G06F 40/258* (2020.01)
*G06V 30/10* (2022.01)
*G06N 5/04* (2006.01)

(52) U.S. Cl.
CPC .......... *G06F 40/205* (2020.01); *G06F 40/258* (2020.01); *G06N 5/04* (2013.01); *G06V 30/414* (2022.01); *G06V 30/416* (2022.01); *G06V 30/10* (2022.01)

(58) Field of Classification Search
CPC .... G06V 30/416; G06V 30/414; G06V 30/10; G06V 30/40; G06V 30/41; G06F 40/258; G06F 40/205; G06N 5/04; G06N 20/00
See application file for complete search history.

(56) References Cited

U.S. PATENT DOCUMENTS

| | | | | |
|---|---|---|---|---|
| 5,784,487 A | * | 7/1998 | Cooperman | G06V 30/416 382/175 |
| 6,298,357 B1 | * | 10/2001 | Wexler | G06F 40/258 715/210 |
| 8,539,342 B1 | * | 9/2013 | Lewis | G06F 40/131 715/251 |
| 8,824,798 B2 | * | 9/2014 | Kimura | G06V 30/414 382/175 |
| 10,025,979 B2 | * | 7/2018 | Lazarevic | G06V 30/416 |

(Continued)

FOREIGN PATENT DOCUMENTS

EP 1679623 A2 7/2006

*Primary Examiner* — Amy M Levy
(74) *Attorney, Agent, or Firm* — Osha Bergman Watanabe & Burton LLP

(57) ABSTRACT

A method, non-transitory computer readable medium, and system for inferring certain texts as stylized section headings in an electronic document (ED). Stylized section headings are section headings that have unique styling distinct from the body of text below each stylized heading. In particular, the stylized section headings are identified based on styling information in the ED. Identifying stylized section headings includes grouping candidate headings based on identification of dominant styling, locating high level fragments, and repeatedly locating nested fragments from within higher level fragments. The ED may or may not include explicitly identified headings in the document.

17 Claims, 16 Drawing Sheets

(56) References Cited

U.S. PATENT DOCUMENTS

| | | | |
|---|---|---|---|
| 10,956,731 B1* | 3/2021 | Gupta | G06F 40/258 |
| 2007/0196015 A1 | 8/2007 | Meunier et al. | |
| 2007/0260564 A1* | 11/2007 | Peters | G06F 40/20 |
| | | | 707/E17.084 |
| 2009/0192956 A1* | 7/2009 | Dejean | G06F 40/103 |
| | | | 706/12 |
| 2010/0245875 A1* | 9/2010 | Komaki | G06V 30/416 |
| | | | 358/1.11 |
| 2010/0306260 A1* | 12/2010 | Dejean | G06V 30/416 |
| | | | 707/811 |
| 2011/0032556 A1* | 2/2011 | Mishima | G06V 30/416 |
| | | | 358/1.11 |
| 2012/0197908 A1 | 8/2012 | Unno | |
| 2013/0019164 A1* | 1/2013 | Whetsell | G06F 40/258 |
| | | | 715/243 |
| 2015/0033116 A1* | 1/2015 | McKinney | G06F 40/258 |
| | | | 715/239 |
| 2015/0088888 A1* | 3/2015 | Brennan | G06F 40/169 |
| | | | 707/737 |
| 2015/0169676 A1 | 6/2015 | Bohra et al. | |
| 2015/0304521 A1* | 10/2015 | Campanelli | H04N 1/3873 |
| | | | 358/1.18 |
| 2016/0048482 A1 | 2/2016 | Tsui | |
| 2019/0392209 A1* | 12/2019 | Tashiro | G06F 40/131 |

* cited by examiner

340 List of Fragments

| Fragment Rank | Fragments |
|---|---|
| 1 | Fragment 6 — 346<br>| Position | Family | RANK | Confidence | Text |<br>|---|---|---|---|---|<br>| 0 | NUMERIC | 1 | 0.82 | 1. This is a main heading |<br>| 2 | NUMERIC | 1 | 0.82 | 2. This is a second main heading |<br>| 19 | NUMERIC | 1 | 0.82 | 3. This is a final main heading. |<br><br>Fragment 4 — 344<br>| Position | Family | RANK | Confidence | Text |<br>|---|---|---|---|---|<br>| 6 | LOWERCASE ROMAN | 1 | 0.36 | i. Item 1 |<br>| 7 | LOWERCASE ROMAN | 1 | 0.36 | ii. Item 2 |<br>| 8 | LOWERCASE ROMAN | 1 | 0.36 | iii. Item 3 |<br>| 9 | LOWERCASE ROMAN | 1 | 0.36 | iv. Item 4 |<br><br>Fragment 3 — 343<br>| Position | Family | RANK | Confidence | Text |<br>|---|---|---|---|---|<br>| 12 | LOWERCASE ALPHABETIC | 1 | 0.36 | a) Item a |<br>| 13 | LOWERCASE ALPHABETIC | 1 | 0.36 | b) Item b |<br>| 14 | LOWERCASE ALPHABETIC | 1 | 0.36 | c) Item c |<br>| 15 | LOWERCASE ALPHABETIC | 1 | 0.36 | d) Item d |  |
| 2 | Fragment 5 — 345<br>| Position | Family | RANK | Confidence | Text |<br>|---|---|---|---|---|<br>| 4 | NUMERIC | 2 | 0.88 | 2.1. This is a subheading |<br>| 10 | NUMERIC | 2 | 0.88 | 2.2. This is a second subheading |<br><br>Fragment 1 — 341<br>| Position | Family | RANK | Confidence | Text |<br>|---|---|---|---|---|<br>| 18 | NUMERIC | 2 | 0.36 | 2.1 is a good section to read if you haven... |  |
| 3 | Fragment 2 — 342<br>| Position | Family | RANK | Confidence | Text |<br>|---|---|---|---|---|<br>| 16 | NUMERIC | 3 | 0.94 | 2.2.1. This is a minor heading. |  |

FIG. 3D

350 Pruned List of Fragments

| Fragment Rank | Fragments | | | | |
|---|---|---|---|---|---|
| | Position | Family | RANK | Confidence | Text |
| 1 Fragment 6 346 | 0 | NUMERIC | 1 | 0.82 | 1. This is a main heading |
| | 2 | NUMERIC | 1 | 0.82 | 2. This is a second main heading |
| | 19 | NUMERIC | 1 | 0.82 | 3. This is a final main heading. |
| 2 Fragment 5 345 | Position | Family | RANK | Confidence | Text |
| | 4 | NUMERIC | 2 | 0.88 | 2.1. This is a subheading |
| | 10 | NUMERIC | 2 | 0.88 | 2.2. This is a second subheading |
| 3 Fragment 2 342 | Position | Family | RANK | Confidence | Text |
| | 16 | NUMERIC | 3 | 0.94 | 2.2.1. This is a minor heading. |

FIG. 3E

360 Merged List of Fragments A

Fragment 6 346

| Fragment Rank | Fragments | | | | |
|---|---|---|---|---|---|
| 1 | Position | Family | RANK | Confidence | Text |
| | 0 | NUMERIC | 1 | 0.82 | 1. This is a main heading |
| | 2 | NUMERIC | 1 | 0.82 | 2. This is a second main heading |
| | 19 | NUMERIC | 1 | 0.82 | 3. This is a final main heading. |

Merged Fragment A 361

| 2 | Position | Family | RANK | Confidence | Text |
|---|---|---|---|---|---|
| | 4 | NUMERIC | 2 | 0.88 | 2.1. This is a subheading |
| | 10 | NUMERIC | 2 | 0.88 | 2.2. This is a second subheading |
| | 16 | NUMERIC | 3 | 0.94 | 2.2.1. This is a minor heading. |

FIG. 3F

370 Merged List of Fragments B

Merged Fragment B 371

| Fragment Rank | Fragments | | | | |
|---|---|---|---|---|---|
| 1 | Position | Family | RANK | Confidence | Text |
| | 0 | NUMERIC | 1 | 0.82 | 1. This is a main heading |
| | 2 | NUMERIC | 1 | 0.82 | 2. This is a second main heading |
| | 4 | NUMERIC | 2 | 0.88 | 2.1. This is a subheading |
| | 10 | NUMERIC | 2 | 0.88 | 2.2. This is a second subheading |
| | 16 | NUMERIC | 3 | 0.94 | 2.2.1. This is a minor heading. |
| | 19 | NUMERIC | 1 | 0.82 | 3. This is a final main heading. |

FIG. 3G

Paragraph number A
511a

ED Portion A
500a

510a Paragraph A

The Western Sage Grouse

Research Done in Field by Mr. Bird Watcher

Wyoming Prairie

June 2019

510b Paragraph B

Feeding Habits

Here is just some plain text. Here is just some plain text. Here is just some plain text. Here is just some plain text. Here is just some plain text. Here is just some plain text. Here is just some plain text. Here is just some plain text. Here is just some plain text. Here is just some plain text. Here is just some plain text. Here is just some plain text. Here is just some plain text. Here is just some plain text. Here is just some plain text. Here is just some plain text. Here is just some plain text. Here is just some plain text. Here is just some plain text. Here is just some plain text. Here is just some plain text. Here is just some plain text. Here is just some plain text. Here is just some plain text.

Here is just some plain text. Here is just some plain text. Here is just some plain text. Here is just some plain text. Here is just some plain text. Here is just some plain text. Here is just some plain text. Here is just some plain text. Here is just some plain text. Here is just some plain text. Here is just some plain text. Here is just some plain text. Here is just some plain text. Here is just some plain text. Here is just some plain text. Here is just some plain text. Here is just some plain text.

Here is just some plain text. Here is just some plain text. Here is just some plain text. Here is just some plain text. Here is just some plain text. Here is just some plain text.

1. Northern Territory Feeding Habits

Here is just some plain text.

510c Paragraph C
510d Paragraph D a. Northwestern Territory

Here is just some plain text. Here is just some plain text. Here is just some plain text. Here is just some plain text. Here is just some plain text. Here is just some plain text. Here is just some plain text. Here is just some plain text. Here is just some plain

FIG. 5A

ED Portion B
500b b. Northeastern Territory ← 510e Paragraph E

2. Southern Territory Feeding Habits ← 510f Paragraph F

Mating Habits
← 510g Paragraph G

Early season

FIG. 5B

ED Portion C
500c

Male Plumage

Female Plumage

With Chicks

Without Chicks

510h Paragraph H

References

1. Wikipedia
2. John's Field Notes
3. Jeff's Prior Research

FIG. 5C

IDENTIFYING SECTION HEADINGS IN A DOCUMENT

CROSS-REFERENCE TO RELATED APPLICATIONS

This a continuation-in-part application of U.S. application Ser. No. 16/370,724, filed on Mar. 29, 2019. The contents of U.S. application Ser. No. 16/370,724 are hereby incorporated herein by reference in their entirety.

BACKGROUND

Content of an electronic document (ED) (e.g., PDF document or OOXML document, etc.) may be organized by the author into sections within the ED. Many different file formats exist. Each file format defines how the content of the file is encoded. Regardless of file formats, semantic information implied by the author, such as sections or section headings, may not be specified using computer-recognizable information within the ED.

SUMMARY

In general, in one aspect, the invention relates to a method for processing an electronic document (ED) to infer a sequence of section headings in the ED. The method includes: generating, by a computer processor and based on a statistical distribution of point sizes of a plurality of characters in the ED, a list of candidate headings in the ED, each candidate heading corresponding to a paragraph in the ED, generating, by the computer processor and from the list of candidate headings, an initial chain fragment that is added to a style chain and removed from the list of candidate headings, iteratively identifying, by the computer processor, an adjacent candidate heading pair (ACHP) in the style chain as a parent ACHP for a corresponding iteration, iteratively generating, by the computer processor and from a remaining list of candidate headings, one or more child chain fragment that is added to the style chain and removed from the remaining list of candidate headings, wherein each child chain fragment is bounded by the parent ACHP for the corresponding iteration, wherein a point size of each child chain fragment is less than or equal to the point size of a leading candidate heading of the parent ACHP, and generating, by the computer processor and based at least on the one or more child chain fragment, the sequence of section headings.

In general, in one aspect, the invention relates to a non-transitory computer readable medium (CRM) storing computer readable program code for processing an electronic document (ED) to infer a sequence of section headings in the ED embodied therein. The computer readable program code, when executed by a computer, includes functionality for: generating, based on a statistical distribution of point sizes of a plurality of characters in the ED, a list of candidate headings in the ED, each candidate heading corresponding to a paragraph in the ED, generating, from the list of candidate headings, an initial chain fragment that is added to a style chain and removed from the list of candidate headings, iteratively identifying an adjacent candidate heading pair (ACHP) in the style chain as a parent ACHP for a corresponding iteration, iteratively generating, from a remaining list of candidate headings, one or more child chain fragment that is added to the style chain and removed from the remaining list of candidate headings, wherein each child chain fragment is bounded by the parent ACHP for the corresponding iteration, wherein a point size of each child chain fragment is less than or equal to the point size of a leading candidate heading of the parent ACHP, and generating, based at least on the one or more child chain fragment, the sequence of section headings.

In general, in one aspect, the invention relates to a system for processing an electronic document (ED) to infer a sequence of section headings in the ED. The system includes: a memory, and a computer processor connected to the memory and configured to: generate, based on a statistical distribution of point sizes of a plurality of characters in the ED, a list of candidate headings in the ED, each candidate heading corresponding to a paragraph in the ED, generate, from the list of candidate headings, an initial chain fragment that is added to a style chain and removed from the list of candidate headings, iteratively identify an adjacent candidate heading pair (ACHP) in the style chain as a parent ACHP for a corresponding iteration, iteratively generate, from a remaining list of candidate headings, one or more child chain fragment that is added to the style chain and removed from the remaining list of candidate headings, wherein each child chain fragment is bounded by the parent ACHP for the corresponding iteration, wherein a point size of each child chain fragment is less than or equal to the point size of a leading candidate heading of the parent ACHP, and generate, based at least on the one or more child chain fragment, the sequence of section headings.

Other aspects of the invention will be apparent from the following description and the appended claims.

BRIEF DESCRIPTION OF DRAWINGS

FIGS. 3A-3G show an implementation example in accordance with one or more embodiments of the invention.

FIGS. 5A-5C show an implementation example in accordance with one or more embodiments of the invention.

DETAILED DESCRIPTION

Figure 1:
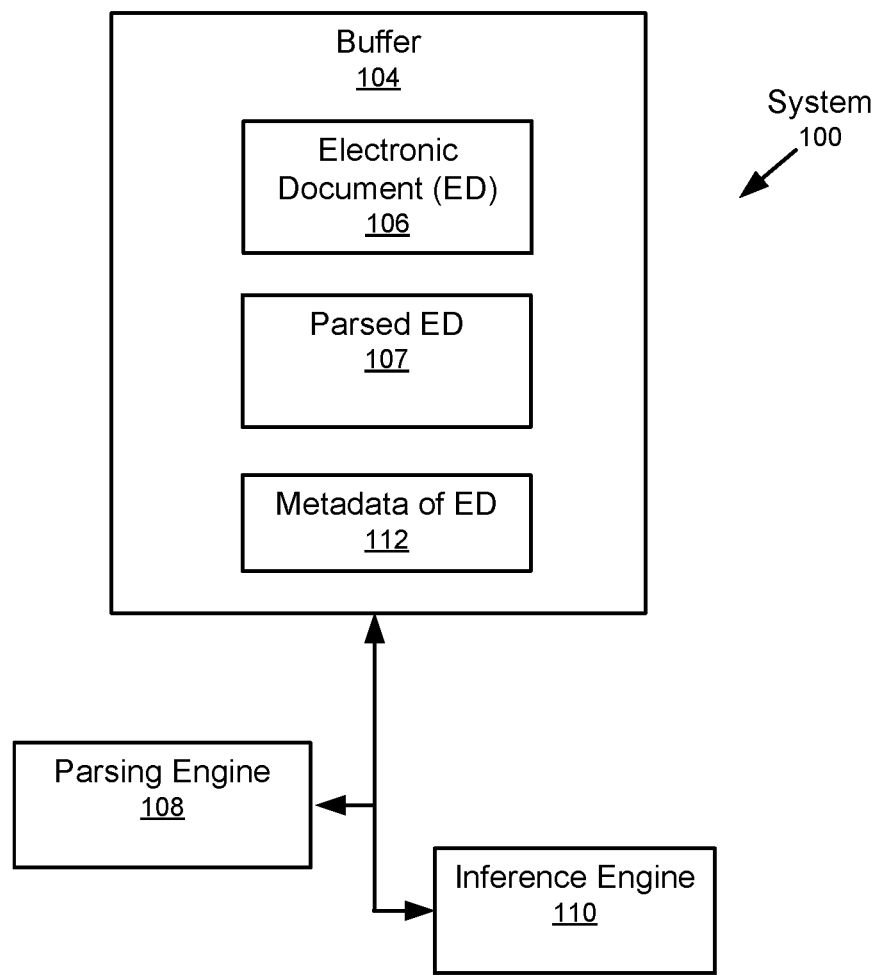
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Some electronic documents (EDs), such as PDF documents or OOXML documents, do not explicitly identify the sections or section headings of the document. In particular, a section heading is a piece of text implied by the author to start a section of the ED. To gain more meaningful insights, users may request to view or search for information in specific sections of large documents. For example, a user may request to retrieve information regarding a specific section in a document by issuing a command such as "Show me the section of this document that talks about the feeding habits of the western sage grouse." In response, the sections and/or section headings of the document, if not explicitly identified, need to be inferred to facilitate targeted queries.

In general, embodiments of the invention provide a method, non-transitory computer readable medium, and system for inferring certain texts as section headings in an ED. In one or more embodiments of the invention, the section headings include sequenced section headings and/or stylized section headings.

In one or more embodiments of the invention, sequenced section headings are section headings in a sequence where each section heading has one or more sequence characters (e.g., 1.1, 1.2, 1.2.1, a., b., i., ii., iii., iv., etc.) in the leading position (i.e., leftmost position) of the section heading. In particular, the sequence characters may be segregated by punctuation(s). The sequence characters in subsequent sequenced section headings follow each other in the sequence. All sequence characters in a sequence heading are of the same family type, which is one of numeric character, upper case Roman numerals, lower case Roman numerals, upper case alphabetic character, and lower case alphabetic character. Accordingly, section headings may be grouped into one or more of 5 possible families including NUMERIC, UPPER CASE ROMAN, LOWER CASE ROMAN, UPPER CASE ALPHABETIC, and LOWER CASE ALPHABETIC based on the sequence character(s) of the section headings.

In one or more embodiments of the invention, stylized section headings are section headings that have unique styling distinct from the body of text below each stylized heading. In particular, the stylized section headings are identified based on styling information in the ED. Identifying stylized section headings includes grouping candidate headings based on identification of dominant styling, locating high level fragments, and repeatedly locating nested fragments from within higher level fragments. The ED may or may not include explicitly identified headings in the document.

In one or more embodiments of the invention, inferred section heading information is inserted or otherwise embedded, e.g., specified as OOXML tags or some other standard, in the ED that previously lacks computer-recognizable identification of sections or section headings. For example, the inferred section heading information may be inserted or otherwise embedded near corresponding texts in the ED, or in other ways, such as in a document property. Further, the final document with embedded inferred information may be in OOXML, PDF, or any other file format that allows searching through standard text searching tools in an operating system or software application. Finally, the main title of the ED, if missing, is identified based on the inferred section headings.

FIG. 1 shows a system (100) in accordance with one or more embodiments of the invention. As shown in FIG. 1, the system (100) has multiple components, including, for example, a buffer (104), a parsing engine (108), and an inference engine (110). Each of these components (104, 108, 110) may be located on the same computing device (e.g., personal computer (PC), laptop, tablet PC, smart phone, multifunction printer, kiosk, server, etc.) or on different computing devices connected by a network of any size having wired and/or wireless segments. Each of these components is discussed below.

In one or more embodiments of the invention, the buffer (104) may be implemented in hardware (i.e., circuitry), software, or any combination thereof. The buffer (104) is configured to store an ED (106) including one or more lines of text made up of characters. The ED (106) may also include images and graphics. The ED (106) may be obtained (e.g., downloaded, scanned, etc.) from any source. The ED (106) may be a part of a collection of EDs. Further, the ED (106) may be of any size and in any format (e.g., PDF, OOXML, ODF, HTML, etc.). The ED (106) includes semantic content implied by the author as sections and section headings, which are not specified or explicitly identified by the ED (106) itself. In other words, the sections and section headings are not specified or explicitly identified using computer-recognizable information, such as tags or other identifiers, in the ED (106).

In one or more embodiments of the invention, the parsing engine (108) may be implemented in hardware (i.e., circuitry), software, or any combination thereof. The parsing engine (108) parses the ED (106) to extract content, layout, and styling information of the characters in the ED (106), and generates a parsed version of the ED (106), referred to as the parsed ED (107), based on the extracted information. In particular, the parsed ED (107) includes representations of the original contents via the extracted information of the ED (106). The parsed ED (107) may be stored in the buffer (104).

In one or more embodiments, the parsed ED (107) is in a common predetermined structured format such as JSON or XML that is encoded with the extracted information from the ED (106). This common format stores the paragraphs, lines, and runs of text as well as corresponding bounding boxes and styling information. Furthermore, this common format may store additional document content, such as images and graphics. An example of the ED (106) and the parsed ED (107) is depicted in FIG. 3A and FIG. 3B, respectively.

Figure 3A:
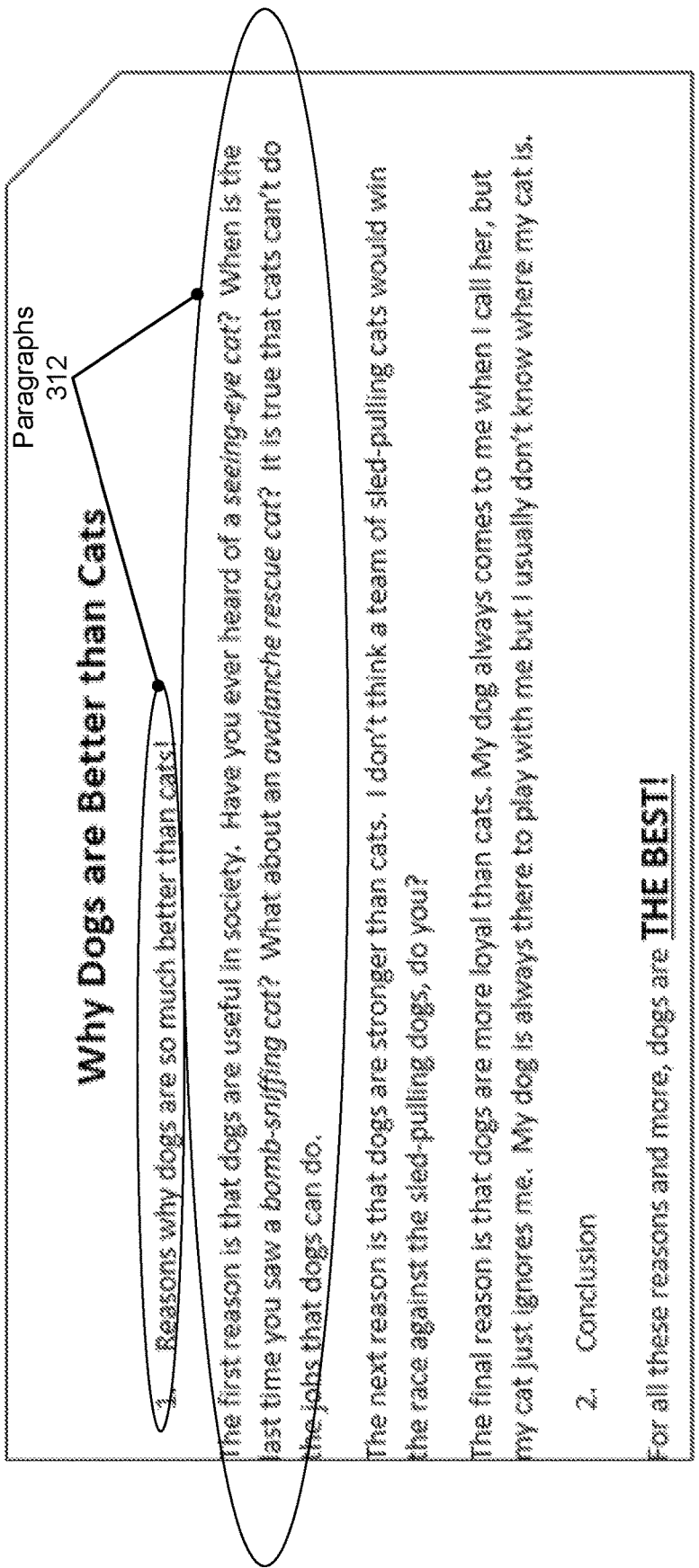

As shown in FIG. 3A, an ED A (310) is an example of the ED (106) and includes multiple lines of text made up of characters. The lines of text may be grouped into paragraphs (312). As seen in FIG. 3A, each paragraph may include a single line or multiple lines of text. After the ED A (310) is parsed, a representation of the common format for a subset of the document is shown in FIG. 3B.

Figure 3B:
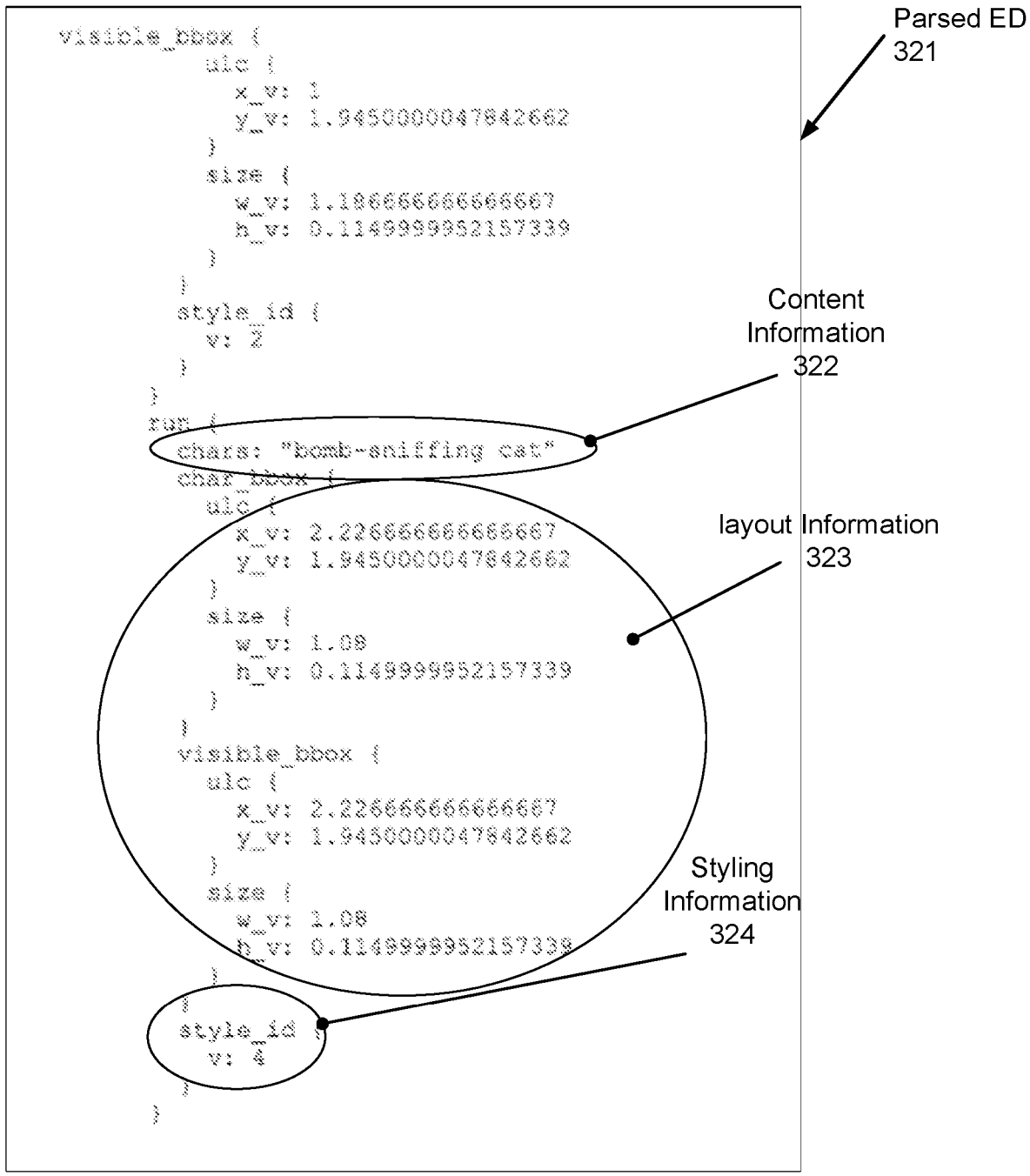

FIG. 3B shows a portion of a parsed version of the ED A (310), referred to as the parsed ED (321). The parsed ED (321) is an example of the parsed ED (107) and includes styling information (324), layout information (323), and content information (322) for the characters in the third paragraph of the ED A (310). For example, content information (322) includes characters "bomb-sniffing cat" shown in FIG. 3A. As seen in FIG. 3B, the styling information (324) is presented as a variable (i.e., v: 4) that defines various features or aspects (i.e., styling) of the text (i.e., style_id). In particular, content information (322) includes all of the characters in the line of text that are applied with the styling information (324).

Although the above is exemplary only, the common format identifies the underlying structure and styling details of the document. In particular, specific paragraphs in the document are identified, with each paragraph broken up into one or more lines of text. Furthermore, each line is broken up into one or more runs of text, where all text in a run has specific styling information. In the example above, the styling information is handled through reference IDs (with the exact styling details for a particular ID appearing in a "run_props" list at the end of the file). In other examples, the styling information may also be encoded inline with the runs themselves. Regardless, the styling details encode information such as typeface, point size, text color, bold, underline, and italic treatments. In addition to styling information, layout information (e.g., layout information (323)) is provided via the char_bbox/visible_bbox which identifies different bounding boxes of paragraphs, lines, and runs. Finally, the text of the document itself is provided as part of each run.

Returning to the discussion of FIG. 1, in one or more embodiments of the invention, the inference engine (110) may be implemented in hardware (i.e., circuitry), software, or any combination thereof. In particular, the inference engine (110) is configured to infer certain texts in the parsed ED (107) as sequenced section headings and/or stylized section headings of the ED (106). Based on the content information and styling attributes extracted by the parsing engine (108), the inference engine (110) generates candidate headings in the ED (106) that are assembled into a number of iteratively-generated chain fragments at increasing rank to construct a sequence of section headings. As used herein, the candidate heading is a piece of text that is a candidate to be identified as a section heading. A chain fragment, or simply referred to as a fragment, is one or more candidate headings that may be qualified as a portion of the set of section headings. Throughout this disclosure, the terms "candidate heading" and "heading" may be used interchangeably unless explicitly specified as "section heading."

In one or more embodiments of the invention, the inference engine (110) generates metadata (112) of the ED (106) that corresponds to one or more intermediate results of the inference engine (110), such as the candidate headings, confidence measures and ranking measures of the candidate headings, chain fragments, parent/child relationships of the chain fragments, etc. In other words, the metadata (112) includes information that represents one or more intermediate results of the inference engine (110). In one or more embodiments, the inference engine (110) stores the metadata (112) in the buffer (104). Alternatively, in one or more embodiments, the inference engine (110) stores the metadata (112) back into the parsed ED (107). The metadata (112) may be stored in an external buffer and retrieved by the inference engine (110) for use.

In one or more embodiments of the invention, the inference engine (110) performs the functionalities described above using the method described in reference to FIG. 2A and/or FIGS. 4A-4C below.

Although the system (100) is shown as having three components (104, 108, 110), in other embodiments of the invention, the system (100) may have more or fewer components. Further, the functionality of each component described above may be split across components. Further still, each component (104, 108, 110) may be utilized multiple times to carry out an iterative operation.

Figure 2A:
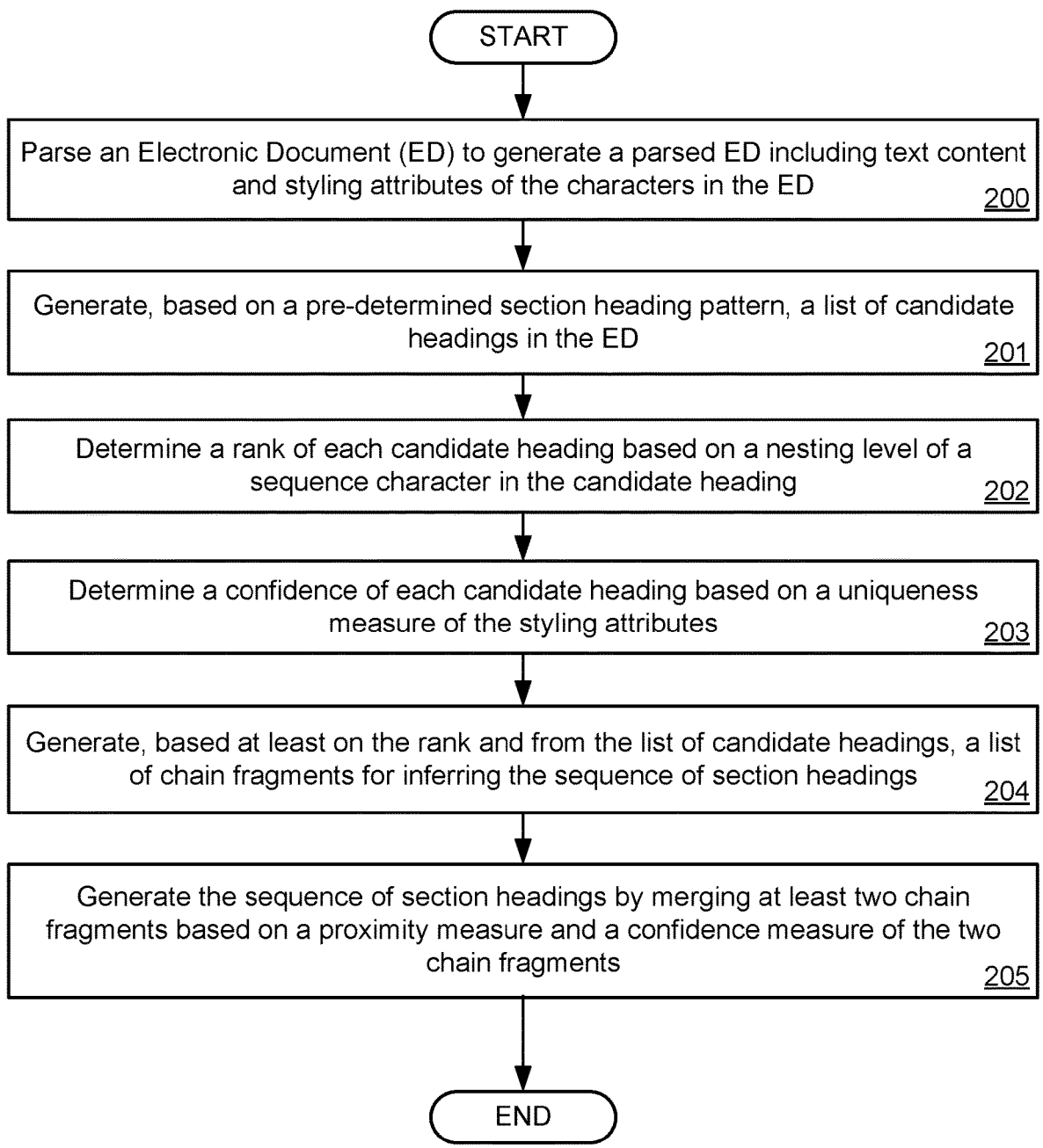
FIGS. 2A-2B show two flowcharts in accordance with one or more embodiments of the invention.

FIG. 2A shows a flowchart in accordance with one or more embodiments of the invention. The flowchart depicts a process for inferring one or more sequenced section headings in an electronic document (ED). One or more of the steps in FIG. 2A may be performed by the components of the system (100), discussed above in reference to FIG. 1. In one or more embodiments of the invention, one or more of the steps shown in FIG. 2A may be omitted, repeated, and/or performed in a different order than the order shown in FIG. 2A. Accordingly, the scope of the invention should not be considered limited to the specific arrangement of steps shown in FIG. 2A.

Referring to FIG. 2A, initially in Step 200, an ED is parsed to generate a parsed version of the ED including styling attributes, layout attributes, and content information of the characters. In particular, the ED includes sections and section headings that are not specified or explicitly identified using computer-recognizable information, such as tags or other identifiers, in the ED.

In Step 201 according to one or more embodiments, a list of candidate headings in the ED are generated based on a predetermined section heading pattern. In one or more embodiments of the invention, the predetermined section heading pattern is a "regular expression," which is a sequence of characters that defines a search pattern. The candidate headings are pieces of text in the ED that match the regular expression for inferring the sequence of section headings ("regular expression matching"). A pattern of <sequence characters> <text> is used as the regular expression for searching candidate headings in the ED. In other words, a piece of text that has a pattern of <sequence characters> <text> is identified as one of the candidate headings. In this context, a candidate heading includes a <sequence characters> portion and a <text> portion, which are referred to as the sequence characters and the text of the candidate heading. The candidate heading includes a single paragraph in the ED. In other words, the candidate headings are delimited by corresponding paragraph bounding boxes. The list of candidate headings is sorted according to paragraph numbers of the candidate headings, and generating the list of candidate headings includes generating metadata that identifies the candidate headings in the list and storing the metadata in association with the ED or parsed version of the ED.

In Step 202 according to one or more embodiments, a rank is generated for each of the candidate headings in the list of candidate headings. The rank of a candidate heading is a measure of the nesting level found in the sequence characters of the candidate heading. For example, the rank may correspond to the number of sequence characters segregated by punctuation(s) in the sequence characters of the candidate heading. The rank is stored as metadata in association with the ED or parsed version of the ED.

In Step 203 according to one or more embodiments, a confidence is generated for each of the candidate headings in the list of candidate headings. The confidence of a candidate heading is a measure of styling uniqueness of the particular candidate heading. For example, the styling uniqueness may correspond to a statistical measure (e.g., percentage) of characters in the ED that have a particular styling. The confidence may be stored as metadata in association with the ED or parsed version of the ED.

In Step 204, according to one or more embodiments, a list of chain fragments for inferring the sequence of section headings is generated based on the list of candidate headings. One or more candidate headings are grouped according to rank and family type into a chain fragment. In other words, all candidate heading(s) in a chain fragment have the same rank and same family type that define the rank and the family of chain fragment. Chain fragments are sorted according to respective ranks to form the list of chain fragments, and the confidence of each chain fragment is determined based on the confidence of each candidate heading included in the chain fragment. Further, one or more chain fragments with average confidence of the underlying candidate headings less than a predetermined confidence threshold are removed or otherwise excluded from the list of chain fragments. Information representing the list of chain fragments is then stored as metadata in association with the ED or parsed version of the ED.

In Step 205 according to one or more embodiments, the sequence of section headings is generated by merging chain fragments based on predetermined criteria, for example a proximity measure and a confidence measure of fragments to be merged. In particular, merging is performed according to respective ranks and families. Within the same family, a lower rank chain fragment is merged into a higher rank chain fragment that is one rank higher than the lower rank chain fragment. Further, a proximity measure between the higher rank chain fragment and the lower rank chain fragment is generated. For example, the proximity measure may correspond to a paragraph number difference between the insertion point in the higher rank chain fragment and the leading candidate heading in the lower rank chain fragment. In addition, a score of the higher rank chain fragment is generated based on a weighted average of the proximity measure and the confidence of the higher rank chain fragment. Accordingly, the higher rank chain fragment is selected as the parent of the lower rank chain fragment based on the score. For example, the higher rank chain fragment is selected as the parent of the lower rank chain fragment if its score is the highest among all possible higher rank chain fragments. Information representing the sequence of section headings is stored as metadata in association with the ED or parsed version of the ED.

Figure 2B:
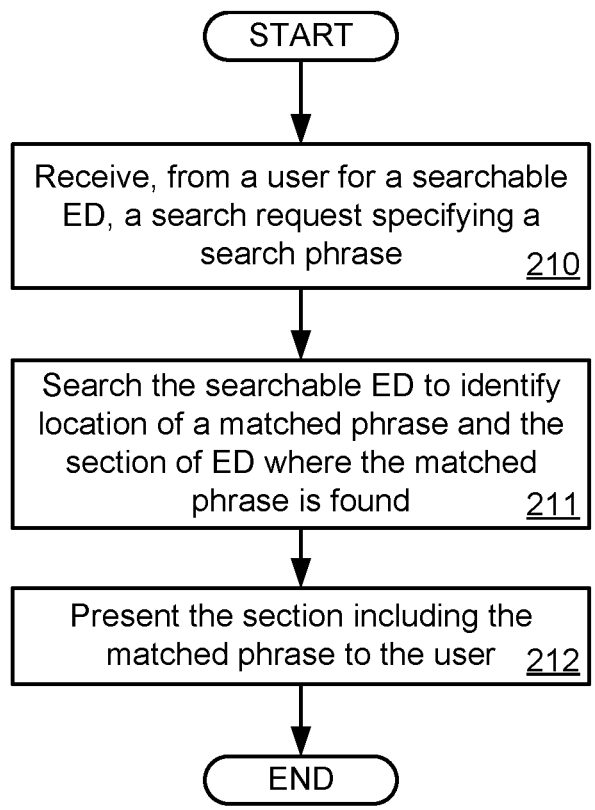

FIG. 2B shows a flowchart in accordance with one or more embodiments of the invention. The flowchart depicts a process for searching in an ED where sections and section headings semantically implied by the author are not specified or explicitly identified using computer-recognizable information, such as tags or other identifiers, in the ED. To enhance the search result, section heading information of the ED may be generated by the components of the system (100) discussed above in reference to FIG. 1, and using the method described in reference to FIG. 2A above. In one or more embodiments of the invention, one or more of the steps shown in FIG. 2B may be omitted, repeated, and/or performed in a different order than the order shown in FIG. 2B. Accordingly, the scope of the invention should not be considered limited to the specific arrangement of steps shown in FIG. 2B.

In Step 210, a search request specifying a search phrase is received from a user. In one or more embodiments of the invention, the user may open the ED in the file viewer. The user may open a search dialog box in the file viewer and type in a search phrase to search for one or more matched phrases that may lead to relevant information in the ED for the user.

In Step 211, the ED is searched to identify the location of one or more matched phrases. For example, multiple matched phrases may exist in the ED while some matched phrases are found in sections of the ED that are more relevant to the user than other matched phrases. Inferred section heading information is added to the ED that existing (e.g., legacy) search engines may use to return entire sections where a matched phrase is found. For example, the section heading information may be inferred and added to the ED prior to receiving the search request from the user. In another example, the section heading information may be inferred and added to the ED in response to receiving the search request from the user. The section heading information is inferred and added to the ED using the method described in reference to FIG. 2A above.

In one or more embodiments of the invention, the viewer search engine searches through the inferred section heading information to identify an entire section where a matched phrase is found. When a match is found, the file viewer obtains the location of the matched phrase and the section containing the matched phrase.

In Step 212, the matched phrase and the section containing the matched phrase are presented to the user in one or more embodiments of the invention. Presenting the matched phrase and the associated section may include highlighting the matched phrase in the associated section. Multiple sections containing multiple matched phrases are presented to the user such that the user may select the section containing most relevant information to the user.

As shown by FIGS. 2A and 2B, one or more embodiments allow for computerized searching of an ED to return not only the matched phrase(s), but also the section(s) of the ED where the matched phrase(s) are found. Thus, the user is able to view additional information related to the search phrase based on section headings semantically implied by the author that are not specified or explicitly identified using computer-recognizable information, such as tags or other identifiers, in the ED.

FIGS. 3C-3G show an implementation example in accordance with one or more embodiments of the invention. The implementation example shown in FIGS. 3C-3G is based on the system and method flowchart described in reference to FIGS. 1, 2A, and 2B above. In one or more embodiments of the invention, one or more of elements shown in FIGS. 3C-3G may be omitted, repeated, and/or organized in a different arrangement. Accordingly, the scope of the invention should not be considered limited to the specific arrangement of elements shown in FIGS. 3C-3G.

Figure 3C:
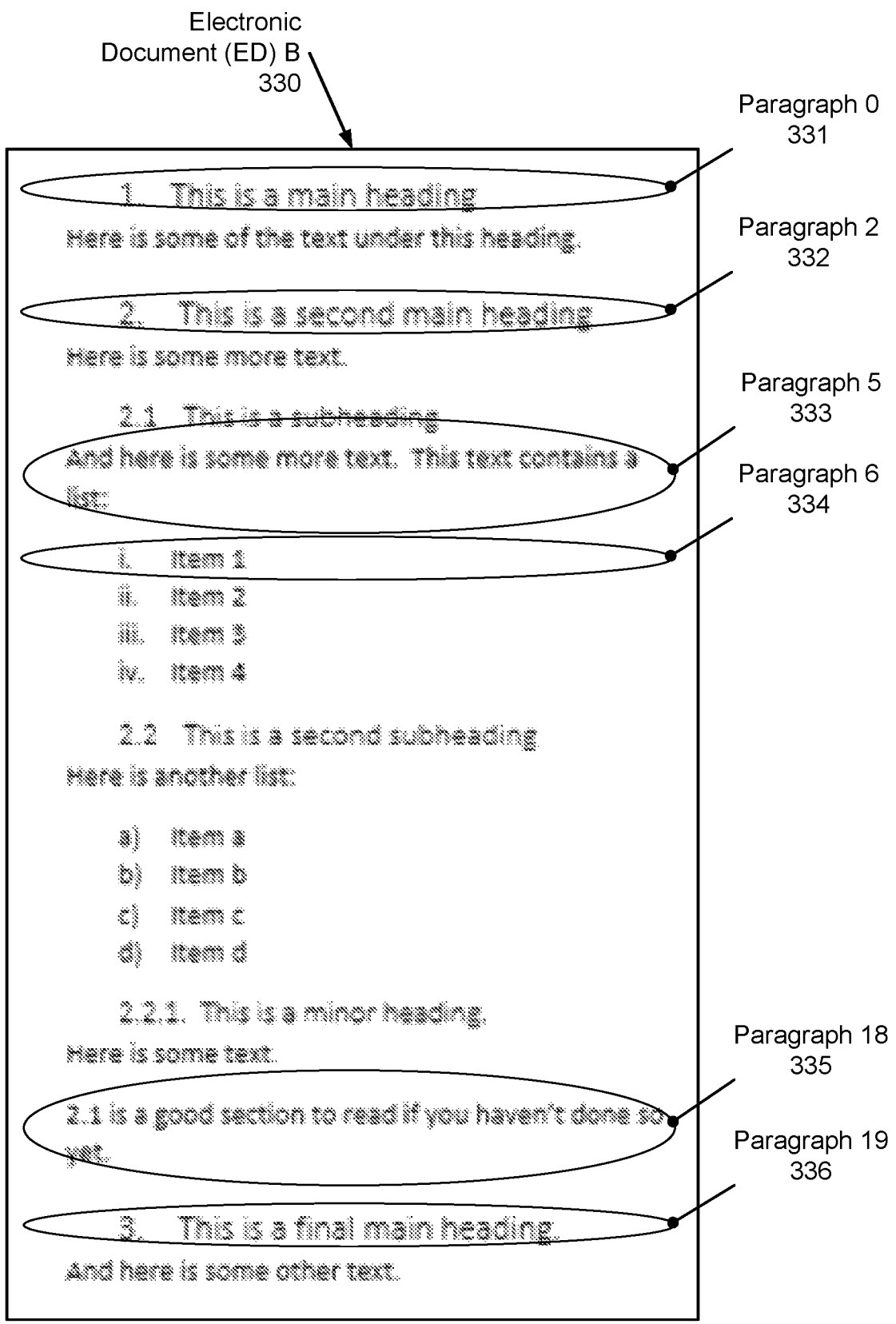

An example of generating the candidate headings with associated rank measure and confidence measure is described in reference to FIG. 3C and TABLE 1 below. As shown in FIG. 3C, the ED B (330) includes 21 paragraphs from paragraph 0 through paragraph 20, such as paragraph 0 (331), paragraph 2 (332), paragraph 5 (333), paragraph 6 (334), paragraph 18 (335), and paragraph 19 (336), etc. By using regular expressions to search for pieces of text that have a pattern of <sequence characters> <text>, the candidate headings in the ED are identified as a list of 16 row entries in TABLE 1 below. In particular, TABLE 1 shows an example of the list of candidate headings described in reference to Steps 201, 202, and 203 of FIG. 2A above.

TABLE 1

| Position | Family | RANK | Confidence | Text |
|---|---|---|---|---|
| 0 | NUMERIC | 1 | 0.82 | 1. This is a main heading |
| 2 | NUMERIC | 1 | 0.82 | 2. This is a second main heading |
| 4 | NUMERIC | 2 | 0.88 | 2.1. This is a subheading |
| 6 | LOWERCASE ALPHABETIC | 1 | 0.36 | i. Item 1 |
| 6 | LOWERCASE ROMAN | 1 | 0.36 | i. Item 1 |
| 7 | LOWERCASE ROMAN | 1 | 0.36 | ii. Item 2 |
| 8 | LOWERCASE ROMAN | 1 | 0.36 | iii. Item 3 |
| 9 | LOWERCASE ROMAN | 1 | 0.36 | iv. Item 4 |
| 10 | NUMERIC | 2 | 0.88 | 2.2. This is a second subheading |
| 12 | LOWERCASE ALPHABETIC | 1 | 0.36 | a) Item a |
| 13 | LOWERCASE ALPHABETIC | 1 | 0.36 | b) Item b |
| 14 | LOWERCASE ALPHABETIC | 1 | 0.36 | c) Item c |
| 15 | LOWERCASE ALPHABETIC | 1 | 0.36 | d) Item d |
| 16 | NUMERIC | 3 | 0.94 | 2.2.1. This is a minor heading. |

TABLE 1-continued

| Position | Family | RANK | Confidence | Text |
|---|---|---|---|---|
| 18 | NUMERIC | 2 | 0.36 | 2.1 is a good section to read if you haven . . . |
| 19 | NUMERIC | 1 | 0.82 | 3. This is a final main heading. |

In the list of candidate headings of TABLE 1, the position of a candidate heading identifies the paragraph number of the candidate heading in the ED B (330). Throughout this disclosure, the term "position" means "the position of a candidate heading" unless otherwise stated. The rank of a candidate heading is a number of sequence characters in the candidate heading. The rank indicates the nesting level for the candidate heading. For example, a candidate heading with sequence character "3." is at rank 1 whereas a candidate heading with sequence characters "2.1" is at rank 2 while a candidate heading with sequence characters "2.2.1" is at rank 3 and so on.

The confidence of a candidate heading indicates the styling uniqueness of the particular candidate heading. Generally, headings implied by the author of the ED have a unique style when compared to the rest of text in the ED. For example, paragraph 0 (331), paragraph 2 (332), and paragraph 19 (336) are all main headings implied by the author and share a common styling, which is unique to only these paragraphs. Hence, the confidence for these candidate headings is computed as 1 minus the quotient of the number of characters with this particular common styling divided by the total number of characters in the ED. In the example of ED B (330), there are 90 characters across paragraph 0 (331), paragraph 2 (332), and paragraph 19 (336), and 503 characters in total. Therefore, the confidence of each of the paragraph 0 (331), paragraph 2 (332), and paragraph 19 (336) is computed as 1−90/503, which is equal to 0.82, as listed in TABLE 1 above.

In particular, note that paragraph 6 (334) is identified in TABLE 1 as two heading candidates, one as LOWERCASE ALPHABETIC and the other as LOWERCASE ROMAN. This is due to ambiguity of "i." as being both an alphabetic letter and a roman numeral. In other words, one or more candidate headings in the ED may be categorized as belonging to multiple families due to ambiguity that is resolved in a later step.

As an example in reference to Step 204 of FIG. 2A above, a number of chain fragments of the sequence of section headings are generated from the candidate headings based on the rank measure. As noted above, a chain fragment, or simply referred to as a fragment, is one or more candidate headings to be qualified as a portion of the sequence of section headings. A candidate heading having a leading sequence character (i.e., '1.' for NUMERIC, 'A.' for UPPERCASE ALPHABETIC, or 'i.' for LOWERCASE ROMAN, etc.) in the rightmost digit of the sequence characters either forms a single-heading chain fragment or acts as a start of a chain fragment having multiple candidate headings. The sequence characters of multiple candidate headings in a chain fragment follow each other from the start of the chain fragment. In one or more embodiments, a chain fragment is generated by walking backwards from the list of candidate headings to search for the start of the chain fragment. As used herein, "backwards" means towards the beginning or top of TABLE 1, while "forward" means towards the end or bottom of TABLE 1. The start of the chain fragment is also referred to as the chain fragment start.

For example, the following sequence characters may all denote the start of a chain fragment. In other words, a candidate heading including the following sequence characters may be identified as a potential chain fragment start.

4.1
4.2.1
4.3.1
1.
i.
a)

Once a potential chain fragment start has been identified, the chain fragment is built in sequence by searching for subsequent candidate headings of the same rank and same family that have the same text styling as the potential chain fragment start, and that have not already been incorporated into other chain fragments. Disambiguation of different interpretations occurs during this step. For example, 'i.' found in a candidate heading is distinguished as either the start of a roman numeral chain or as the 9th entry in an alphabetic chain. In particular, the distinction is based on whether a chain fragment is generated using "i." as the chain fragment start. In other words, if a chain fragment is generated using "i." as the chain fragment start, then "i." is treated as a roman numeral. Otherwise, if no chain fragment is generated using "i." as the chain fragment start, then "i." is treated as an alphabetic letter.

Continuing with the example of FIG. 3C and TABLE 1 above, the algorithm starts with paragraph 19 (336) and finds that the sequence characters of this candidate heading ends with a 3 and does not start a chain fragment. The next candidate heading counting backwards from the end of TABLE 1 is paragraph 18 (335) that has the sequence characters 2.1 ending with a 1. Therefore, the paragraph 18 (335) is selected as starting a chain fragment. From the selected paragraph 18 (335), the algorithm then walks forward towards the end of TABLE 1 searching for the next sequence characters 2.2 in a candidate heading with the same styling as the paragraph 18 (335). However, such a candidate heading is not found in the list of TABLE 1 and this concludes the chain fragment 1 having a single candidate heading as shown in TABLE 2 below.

TABLE 2

CHAIN FRAGMENT 1:

| Position | Family | RANK | Confidence | Text |
|---|---|---|---|---|
| 18 | NUMERIC | 2 | 0.36 | 2.1 is a good section to read if you haven . . . |

Similar to the paragraph 18 in the list of TABLE 1, paragraph 16 is identified as a chain fragment start form which chain fragment 2 is generated with a single candidate heading as shown in TABLE 3 below.

TABLE 3

CHAIN FRAGMENT 2:

| Position | Family | RANK | Confidence | Text |
|---|---|---|---|---|
| 16 | NUMERIC | 3 | 0.94 | 2.2.1. This is a minor heading. |

The algorithm continues walking backwards in the list of TABLE 1 and identifies the paragraph 12 as a chain fragment start based on the 'a)' at the leftmost digit of the sequence characters. The algorithm then moves forwards in TABLE 1 searching for the next candidate heading that shares the same family (LOWERCASE ALPHABETIC) and styling and is sequentially next in line. Accordingly, paragraphs 13, 14 and 15 are included in the chain fragment 3 as shown in TABLE 4 below.

TABLE 4

CHAIN FRAGMENT 3:

| Position | Family | RANK | Confidence | Text |
|---|---|---|---|---|
| 12 | LOWERCASE ALPHABETIC | 1 | 0.36 | a) Item a |
| 13 | LOWERCASE ALPHABETIC | 1 | 0.36 | b) Item b |
| 14 | LOWERCASE ALPHABETIC | 1 | 0.36 | c) Item c |
| 15 | LOWERCASE ALPHABETIC | 1 | 0.36 | d) Item d |

The algorithm again continues backwards in the list of TABLE 1 and identifies the paragraph 6 as a potential chain fragment start. Here, there are two possible interpretations for 'i.' in the candidate heading. The first interpretation of 'i.' as LOWERCASE ALPHABETIC is not identified as a potential chain fragment start and is ignored. The second interpretation of 'i.' as LOWERCASE ROMAN is identified as a potential chain fragment start and is adopted by the algorithm to proceed further. Accordingly, the chain fragment 4 is generated using the paragraph 6 as the chain fragment start as shown in TABLE 5 below.

TABLE 5

CHAIN FRAGMENT 4:

| Position | Family | RANK | Confidence | Text |
|---|---|---|---|---|
| 6 | LOWERCASE ROMAN | 1 | 0.36 | i. Item 1 |
| 7 | LOWERCASE ROMAN | 1 | 0.36 | ii. Item 2 |
| 8 | LOWERCASE ROMAN | 1 | 0.36 | iii. Item 3 |
| 9 | LOWERCASE ROMAN | 1 | 0.36 | iv. Item 4 |

Similarly, chain fragments 5 and 6 are generated as shown in TABLE 6 and
TABLE 7 below.

TABLE 6

CHAIN FRAGMENT 5:

| Position | Family | RANK | Confidence | Text: |
|---|---|---|---|---|
| 4 | NUMERIC | 2 | 0.88 | 2.1. This is a subheading |
| 10 | NUMERIC | 2 | 0.88 | 2.2. This is a second subheading |

TABLE 7

CHAIN FRAGMENT 6:

| Position | Family | RANK | Confidence | Text |
|---|---|---|---|---|
| 0 | NUMERIC | 1 | 0.82 | 1. This is a main heading |
| 2 | NUMERIC | 1 | 0.82 | 2. This is a second main heading |

TABLE 7-continued

CHAIN FRAGMENT 6:

| Position | Family | RANK | Confidence | Text |
|---|---|---|---|---|
| 19 | NUMERIC | 1 | 0.82 | 3. This is a final main heading. |

As described above in reference to Step 204 of FIG. 2A, the chain fragments are sorted by rank. In one or more embodiments, all chain fragments at rank 1 are first added to a list of fragments, followed by all chain fragments at rank 2, then rank 3 and so on. An example of the sorted list of fragments (340) generated from the ED B (330) is shown in FIG. 3D. As shown in FIG. 3D, the chain fragment 6 (346), chain fragment 4 (344), and chain fragment 3 (343) are included in rank 1 portion of the list of fragments (340); the chain fragment 5 (345) and chain fragment 1 (341) are included in rank 2 portion of the list of fragments (340); and the chain fragment 2 (342) is included in rank 3 portion of the list of fragments (340).

Further, disqualified chain fragments are removed from the list of fragments. Once all chain fragments have been built, the algorithm then proceeds to prune chain fragments that are unlikely to form larger sequence chains. In one or more embodiments, chain fragments that are identified as lists or as chain fragments that fall below a certain confidence threshold are disqualified and removed from the list of fragments.

A chain fragment is identified as a list if the "list probability" of the chain fragment falls above a particular threshold. The "list probability" is computed as the ratio of the number of adjacent candidate headings in the chain fragment to the total number of candidate headings in the chain fragment. For example, the chain fragment 6 (346) consisting of paragraphs 0, 2, and 19 have 0 adjacent candidate headings because 0, 2, and 19 are not adjacent paragraph positions. Therefore, the "list probability" of the chain fragment 6 (346) is 0/3=0. In another example, the chain fragment 4 (344) consisting of paragraphs 6, 7, 8, and 9 have 4 adjacent paragraphs and the "list probability" is 4/4=1. A chain fragment having a single candidate heading is not considered for pruning based on "list probability" as there is not enough context to identify whether the chain fragment is an isolated heading or a list of one element.

The confidence of a chain fragment is computed as the average of the confidences of all candidate headings of the chain fragment. For example, the confidence of the chain fragment 5 (345) having paragraphs 4 and 10 is computed as 0.88. Chain fragments with a confidence below a specified threshold are also pruned.

In one or more embodiments, a "list probability" threshold of 1 and a chain fragment confidence threshold of 0.8 are used. Accordingly, the chain fragment 4 (344) consisting of paragraphs 6, 7, 8, and 9; the chain fragment 3 (346) consisting of paragraphs 12, 13, 14, and 15; and the chain fragment 1 (341) consisting of paragraph 18 are removed from the list of fragments (340) to generate a pruned list of fragments (350), as shown in FIG. 3E.

As an example in reference to Step 205 of FIG. 2A above, the sequence of section headings is generated from the pruned list of fragments by merging lower rank chain fragments into higher rank chain fragments. Starting with chain fragments at the lowest rank, a possible parent for each chain fragment is located. Of all possible parents, the best parent is chosen such that the parent and child chain fragments are merged. This process repeats to move higher in ranks of the chain fragments.

In one or more embodiments, merging chain fragments at a particular rank is based on the process below.

Sort all chain fragments at a particular rank by decreasing confidence to process the most confident chain fragments first.

For each chain fragment in the sorted list above:
   a. Generate a list of all parent chain fragments (potential_parents) that the chain fragment may potentially fit in. The set of parent chain fragments to search through is one rank higher than the rank of the current chain fragment. So, for each parent chain fragment in the set of chain fragments one rank above, if the chain fragment potentially fits within the parent chain fragment, then the parent chain fragment and the position of a parent heading it fits after (parent_pos) is added to the list potential_parents. In other words, the parent heading is the candidate heading after which the child chain fragment may be inserted for merging. A function Fits Within( ) is used that will be described in detail below.
   b. For each fragment in the potential_parents, identify the distance from parent_pos to the position of the first candidate heading in the child chain fragment and record the maximum distance as max_dist.
   c. Identify the best parent chain fragment in potential_parents. This is done using a combination of proximity and chain fragment confidence. A function ScoreFit( ) is applied to each parent chain fragment to select the parent chain fragment with the highest score.
   d. Merge the chain fragment into the best parent chain fragment.

Specifically, each candidate heading in the chain fragment is moved into the best parent chain fragment and the now empty chain fragment is deleted.

Here is an example expansion of the function Fits Within( ):

For each heading in the parent chain fragment, execute the steps below:
   a. Identify the next heading in the parent chain fragment after the current parent heading, if present, and designate it as next_heading.
   b. Identify a placement_fit for the child chain fragment. The placement_fit is true if the first heading position in the child chain fragment is greater than the current parent heading position parent_pos, and either 1) there is no next_heading or 2) there is a next_heading and the last heading position in the child chain fragment is less than the position of next_heading.
   c. Identify a sequence_fit for the child chain fragment. The sequence_fit is true if the first heading position in the child chain fragment follows the sequence characters of the current parent heading. For example, both 2.3 and 2.2.1 follows 2.2 and would qualify for a sequence fit whereas 2.2.2 and 2.4 does not follow 2.2 and would disqualify for a sequence fit. The check of whether or not one candidate heading follows another is handled in the function Follows( ) that is described later.
   d. If there is both a placement_fit and a sequence_fit for the current parent heading, identify this parent fragment and the parent heading (parent_pos) after which to insert the child chain fragment and exit the loop.

If a parent fragment has been identified, then verify that the parent fragment does not have sequence characters that match the sequence characters of the first heading in the child chain fragment. In other words, verify that the child chain fragment intended to be added is not already present in the parent chain fragment. If it is, or no suitable parent heading is located, then return 'NULL' for the parent fragment and return '−1' for parent_pos. Otherwise, return a reference to the parent fragment and parent_pos.

Here is an example expansion of the function ScoreFit( ):

Calculate a distance score based on the distance from the child chain fragment to the parent chain fragment. For example, dist_score=1.0−(difference between position of first heading in child chain fragment and parent_pos)/max_dist.

Calculate a confidence_score as the average confidence of all headings in the parent chain fragment.

Return a weighted average of the dist_score and the confidence_score. As the final_score. For example, final_score=0.75*dist_score+0.25*confidence_score.

Here is an example expansion of the function Follows(a, b) to determine whether heading b follows heading a:

Build an array of numeric levels corresponding to both a and b. The size of the array is equal to the heading's rank, and each entry in the array is the numerical equivalent of each character entry in the sequence. Here are a few examples of the numeric levels for some different sequenced headings:

| Family | Heading | Numeric Level Array | | | |
|---|---|---|---|---|---|
| NUMERIC | 1.2. | 1 | | 2 | |
| NUMERIC | 1.2.4.1. | 1 | 2 | 4 | 1 |
| LOWERCASE_ALPHABETIC | a) | | | 1 | |
| LOWERCASE_ROMAN | iv. | | | 4 | |
| LOWERCASE_ALPHABETIC | a.d. | 1 | | 4 | |

Initialize a bool found_an_increment to false.

Repeat for each entry in the numeric levels array of b:
   a. Identify the position of this entry and call it entry_num.
   b. If found_an_increment is true, return false. (Rationale: If an increment has already been found, then there shouldn't be any more entries in b's numeric levels array. Example: 4.2.1.1 does not follow 4.2.)
   c. If the entry number is less than the size of a's numeric levels array, then:
      i. If b's numeric levels array at entry_num is less than a's numeric levels array at entry_num, return false. (Example: 4.2.1 does not follow 4.2.3 because 1 is less than 3.)
      ii. If b's numeric levels array at entry_num is equal to a's numeric levels array at entry_num added to 1, then set found_an_increment to true. Otherwise, if b's numeric levels array at entry_num does not equal a's numeric levels array at entry_num, return false. (Rationale: If b's value is greater than a's corresponding value by 1, then an increment was found. Otherwise, only continue to the next entry in the numeric levels array if the current corresponding values are equal. Example: 4.2.2 follows 4.2.1)
   d. Otherwise if the entry number is equal to the size of a's numeric levels array, then:
      i. If b's numeric levels array at entry_num is equal to 1, then set found_an_increment to true. (Example: 4.2.1 follows 4.2).

Return found_an_increment.

Continuing with the discussion of the pruned list of fragments (350) shown in FIG. 3E above, the process of merging chain fragments starts with all chain fragments at the lowest rank, which is 3 in the fragment 2 (342). All chain fragments at this rank are sorted by decreasing confidence. With only one chain fragment (i.e., fragment 2 (342)) at rank 3 the sorting has no effect. The process of merging chain fragments starts with all the chain fragments at one rank higher, which is rank 2. In the pruned list of fragments (350), there is only one chain fragment (i.e., fragment 5 (345)) at rank 2. The function Fits Within( ) is applied to determine whether the fragment 2 (342) at rank 3 fits as a child fragment within the fragment 5 (345) at rank 2 as the parent fragment.

Inside FitsWithin( ), each heading in the fragment 5 (345) at rank 2 is evaluated. The first heading corresponds to paragraph 4 as below.

| Position | Family | RANK | Confidence | Text |
|---|---|---|---|---|
| 4 | NUMERIC | 2 | 0.88 | 2.1. This is a subheading |

For this heading, placement_fit is false because there is a next heading (position 10) in the fragment 5 (345) and the last heading position 16 in the fragment 2 (342) is not less than the position 10 of the next heading. Furthermore, sequence_fit is false because the sequence characters 2.2.1 in the fragment 2 (342) does not follow the sequence characters 2.1 in the fragment 5 (345). Therefore, the evaluation of Fits Within( ) continues to the next heading in the fragment 5 (345) at rank 2. The next heading corresponds to paragraph 10 as below.

| Position | Family | RANK | Confidence | Text |
|---|---|---|---|---|
| 10 | NUMERIC | 2 | 0.88 | 2.2. This is a second subheading |

For this heading, placement_fit is true because there is no next heading in the fragment 5 (345) and the first heading position 16 in the child fragment 2 (342) is greater than the current parent heading position 10 in the parent fragment 5 (345). Furthermore, sequence_fit is true because the sequence characters 2.2.1 in the child fragment 2 (342) follows the sequence characters 2.2 in the parent fragment 5 (345).

Finally, it is verified that there is not already a heading with sequence characters of 2.2.1 in the fragment 5 (345) at rank 2. Given that the parent fragment does not already contain the child fragment, Fits Within( ) returns the fragment 5 (345) as the parent fragment and a parent_pos of 10, which are added to the list of potential parents.

Given that there is only one potential parent in the list, the fragment 5 (345) at rank 2 is selected as the best parent for the fragment 2 (342) at rank 3. Accordingly, the fragment 2 (342) at rank 3 is merged into the fragment 5 (345) at rank 2 to generate a merged list of fragments A (360) shown in FIG. 3F. As shown in FIG. 3F, the merged list of fragments A (360) includes the fragment 6 (346) at rank 1 and the merged fragment A (361) at rank 2. In particular, the merged fragment A (361) is a combination of the fragment 2 (342) and the fragment 5 (345) in the pruned list of fragments (350).

There are no more chain fragments remaining at rank 3, so the merging process repeats a second time in the merged list of fragments A (360) with all chain fragments at rank 2, which include only the merged fragment A (361). According to the merging process, all chain fragments at rank 2 are sorted by decreasing confidence. With only one chain fragment (i.e., merged fragment A (361)), the sorting has no effect. Accordingly, the process of merging chain fragments starts with all the chain fragments at one rank higher, which is rank 1. In the merged list of fragments A (360), there is only one chain fragment (i.e., fragment 6 (346)) at rank 1. The function FitsWithin( ) is applied to determine whether the merged fragment A (361) at rank 2 fits as a child fragment within the fragment 6 (346) at rank 1 as the parent fragment.

Inside FitsWithin( ), each heading in the fragment 6 (346) at rank 1 is evaluated. The first heading corresponds to paragraph 0 as below.

| Position | Family | RANK | Confidence | Text |
|---|---|---|---|---|
| 0 | NUMERIC | 1 | 0.82 | 1. This is a main heading |

For this heading, placement_fit is false because there is a next heading (position 2) in the fragment 6 (346) and the last heading position 16 in the merged fragment A (361) is not less than the position 2 of the next heading. Furthermore, sequence_fit is false because the sequence characters 2.1 in the merged fragment A (361) does not follow the sequence character 1 in the fragment 6 (346). Therefore, the evaluation of FitsWithin( ) continues to the next heading in the fragment 6 (346) at rank 1. The next heading corresponds to paragraph 2 as below.

| Position | Family | RANK | Confidence | Text |
|---|---|---|---|---|
| 2 | NUMERIC | 1 | 0.82 | 2. This is a second main heading |

For this heading, placement_fit is true because the first heading position 4 in the merged child fragment A (361) is greater than the current parent heading position 2 in the parent fragment 6 (346). In addition, the last heading position 16 in the merged child fragment A (361) is less than the next heading position 19 in the parent fragment 6 (346). Furthermore, sequence_fit is true because the sequence characters 2.1 in the merged child fragment A (361) follows the sequence character 2 in the parent fragment 6 (346).

Finally, it is verified that there is not already a heading with sequence characters of 2.1 in the fragment 6 (346) at rank 1. Given that the parent fragment does not already contain the child fragment, Fits Within( ) returns the fragment 6 (346) as the parent fragment and a parent_pos of 2, which are added to the list of potential parents.

Given that there is only one potential parent in the list, the fragment 6 (346) is selected as the best parent for the merged fragment A (361) at rank 2. Accordingly, the merged fragment A (361) at rank 2 is merged into the fragment 6 (346) at rank 1 to generate a merged list of fragments B (370) shown in FIG. 3G. As shown in FIG. 3G, the merged list of fragments B (370) includes only the merged fragment B (371) at rank 1. In particular, the merged fragment B (371) is a combination of the merged fragment A (361) and the fragment 6 (346) in the merged list of fragments A (360).

The merging process has now completed and the merged fragment B (371) is identified as the sequenced headings, or the sequence of section headings of the ED B (330). From this information, sections may be automatically identified as the text regions between section headings and the overall nesting of sections in the document can be identified from rank information allowing queries such as "show me the section about . . . " to be answered.

In various steps of the example described above, inferred metadata is generated for intermediate results in one or more embodiments of the invention. In particular, the inferred metadata includes representations of the list of candidate headings, associated ranks and confidence, the list of chain fragments, associated scores and parent/child relationships, etc. In one or more embodiments of the invention, the inferred metadata is added to the ED and/or parsed version of the ED.

Figure 4A:
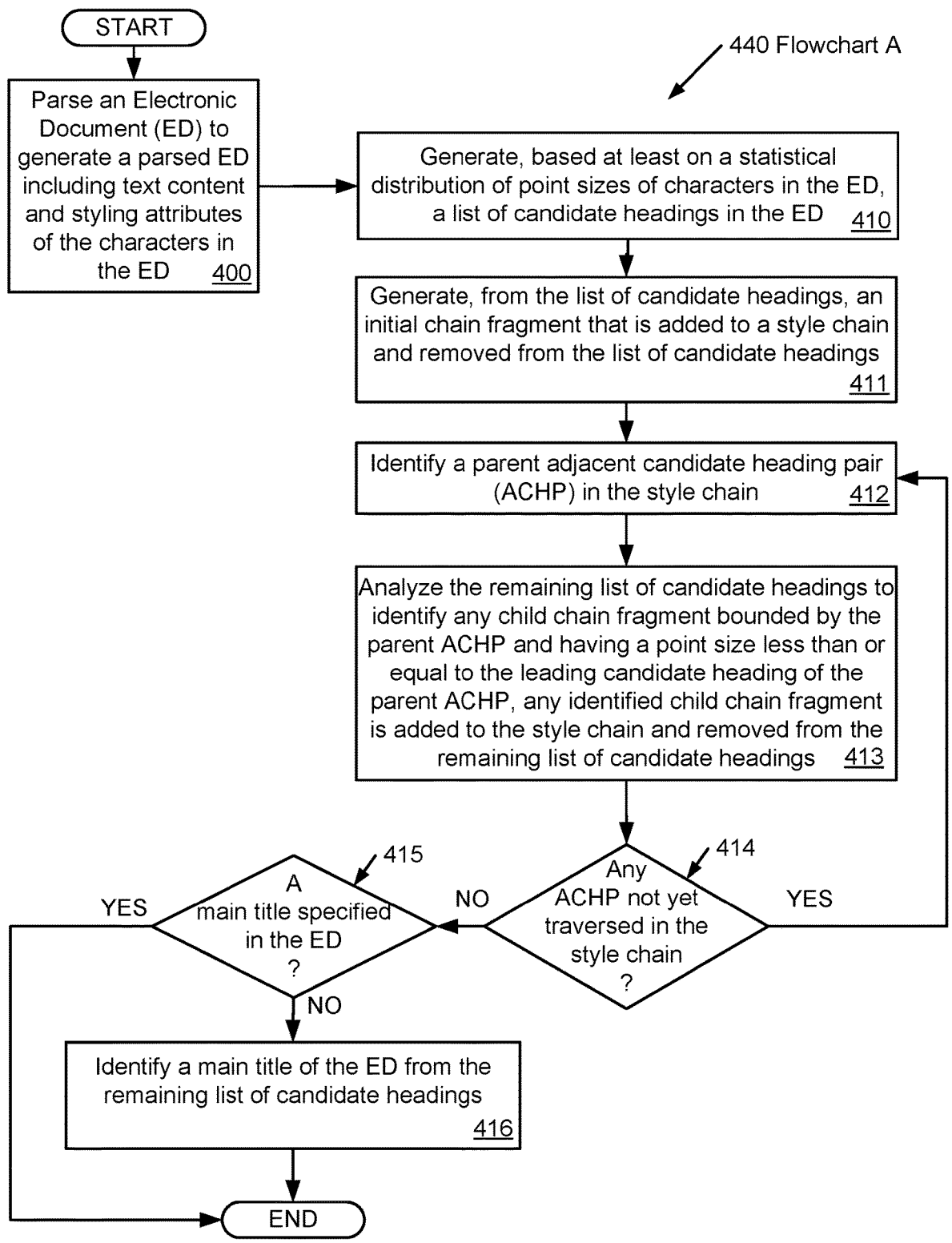
FIGS. 4A-4C show a flowchart in accordance with one or more embodiments of the invention.

FIG. 4A shows a flowchart A (440) in accordance with one or more embodiments of the invention. Flowchart A (440) illustrates a process for inferring one or more stylized section headings in an electronic document (ED). One or more of the steps in FIG. 4A may be performed by the components of the system (100), discussed above in reference to FIG. 1. In one or more embodiments of the invention, one or more of the steps shown in FIG. 4A may be omitted, repeated, and/or performed in a different order than the order shown in FIG. 4A. Accordingly, the scope of the invention should not be considered limited to the specific arrangement of steps shown in FIG. 4A.

Referring to FIG. 4A, initially in Step 400, an ED is parsed to generate a parsed version of the ED including styling attributes, layout attributes, and content information of the characters. In particular, the ED includes sections and section headings that are not specified or explicitly identified using computer-recognizable information, such as tags or other identifiers, in the ED. In one or more embodiments, certain explicit headings are identifiable in the ED based on heading styling embedded in the document.

In Step 410 according to one or more embodiments, a list of candidate headings in the ED is generated based at least on a statistical distribution of point sizes of characters in the ED. In one or more embodiments, each paragraph in the ED has a unique point size throughout the paragraph. In one or more embodiments, each candidate heading corresponds to a paragraph having a point size that exceeds a pre-determined point size threshold of the ED. Furthermore, each candidate heading corresponds to a paragraph having a point size that is equal to said pre-determined point size threshold if it is identified as a sequenced heading. In the list of candidate headings, candidate headings are grouped based on respective point sizes into same-point-size groups. In particular, each same-point-size group includes one or more paragraphs with characters that have the same point size. The list of candidate headings may further include explicit headings extracted from the ED based on embedded styling information or other metadata.

In Step 411 according to one or more embodiments, an initial chain fragment is generated from the list of candidate headings. For example, the initial chain fragment may include explicit headings in the list of candidate headings. Once generated, the initial chain fragment is added to a list that is iteratively augmented through the iteration loop containing Steps 412, 413, and 414. The list is referred to as a style chain. As the initial chain fragment is added to the style chain, the initial chain fragment is also removed from the list of candidate headings. The style chain may include one or more explicit section headings prior to adding the initial chain fragment to the style chain.

In Step 412 according to one or more embodiments, for each iteration through Steps 412, 413, and 414, an adjacent candidate heading pair (ACHP) is identified in the style chain as a parent ACHP for the corresponding iteration. Specifically, the ACHP is a pair of candidate headings adjacent to each other in the style chain. The candidate heading with a lower (i.e., smaller) paragraph number in the ACHP is referred to as the leading candidate heading having a leading paragraph number. The other candidate heading with the higher (i.e., larger) paragraph number in the ACHP is referred to as the trailing candidate heading having a trailing paragraph number.

In one or more embodiments, in the first iteration through Steps 412, 413, and 414, the parent ACHP is a pair of candidate headings adjacent to each other in the initial chain fragment. In each of subsequent iterations, as the style chain is augmented by adding additional candidate headings from the list of candidate headings, additional ACHP are iteratively created and traversed. The parent ACHP may be selected from any ACHP in the style chain using selection methods such as random selection, sequential selection, etc. Alternatively, the parent ACHP is selected using the method described in reference to FIG. 4B below.

In Step 413 according to one or more embodiments, a remaining list of candidate headings is analyzed to identify any child chain fragment. The remaining list of candidate headings is the remainder of the list of candidate headings generated in Step 410 after any subsequent removal of candidate heading(s). A child chain fragment is a same-point-size group where all paragraph numbers in the same-point-size group are in-between the leading paragraph number and the trailing paragraph number of the parent ACHP. In addition, the point size of each child chain fragment is less than or equal to the point size of the leading candidate heading of the parent ACHP. Any identified child chain fragment is added to the style chain and removed from the remaining list of candidate headings. By adding the child chain fragment to the style list, additional candidate headings are added to augment the style list. An ACHP in the additional candidate headings is later selected in the next iteration as the parent ACHP in Step 412. In one or more embodiments, the child chain fragment identified in the current iteration includes the parent ACHP of the next iteration.

In one or more embodiments, if multiple child chain fragments are generated in the current iteration, one child chain fragment is selected based on a pre-determined algorithm. The selected child chain fragment is added to the style chain and removed from the remaining list of candidate headings.

In one or more embodiments, Step 413 is performed using at least a portion of the method described in reference to FIG. 4B below.

In Step 414 according to one or more embodiments, a determination is made as to whether any ACHP is not yet traversed in the style chain. If the determination is positive, i.e., at least one ACHP in the style chain has not been identified and used as the parent ACHP in a previous iteration of Steps 412, 413, and 414, the method returns to Step 412. If the determination is negative, i.e., all ACHPs in the style chain have been identified and used as the parent ACHP in a previous iteration of Steps 412, 413, and 414, the method proceeds to Step 415. With the determination being negative in Step 414, the style chain with the child chain fragments from all iteration(s) of Steps 412, 413, and 414 is the sequence of section headings of the ED.

In Step 415 according to one or more embodiments, a determination is made as to whether a main title is specified in the ED. If the determination is negative, i.e., no main title is specified in the ED, the method returns to Step 416. If the determination is positive, i.e., a main title is specified in the ED, the method ends.

In Step 416, the remaining list of candidate headings is analyzed to generate the main title of the ED. For example, the candidate heading with the largest point size or with the smallest paragraph number in the remaining list of candidate headings may be selected as the main title of the ED. An example of generating the main title of the ED is described in reference to FIGS. 5A-5C below.

In one or more embodiments, the methods described in reference to FIGS. 2A and 4A may be combined to generate the sequence of section headings of the ED. For example, the list of candidate headings in Step 410 may include at least one sequenced section heading generated using the method of FIG. 2A. In another example, the sequence of section headings generated using the method of FIG. 2A may be combined with the sequence of section headings generated using the method of FIG. 4A. Details of Step 412 are further described in reference to FIG. 4B below and details of Step 413 are further described in reference to FIG. 4C below. As described in reference to FIGS. 4A, 4B, and 4C, the procedures of iteratively assembling chain fragments into the style chain based on the style attribute (i.e., point size) are referred to as the iterative style chain generation algorithm.

Figure 4B:
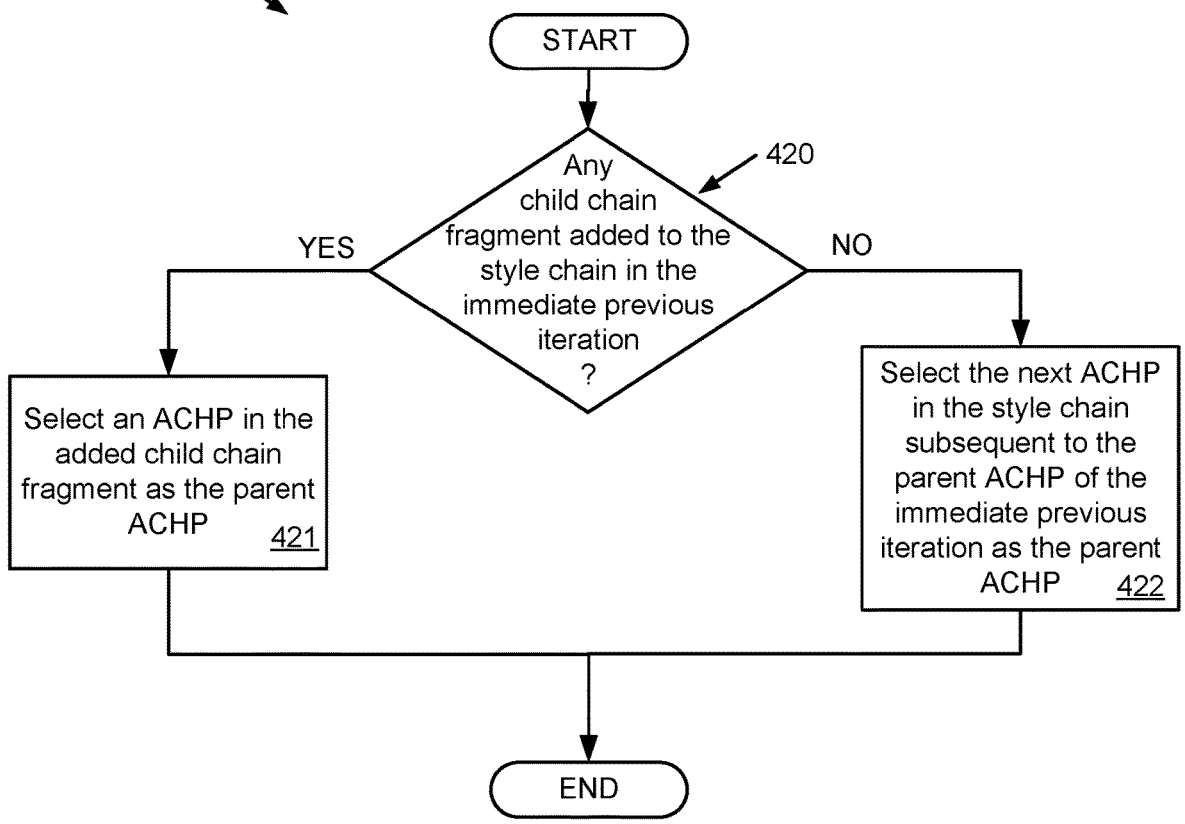

FIG. 4B shows a flowchart B (450) in accordance with one or more embodiments of the invention. Flowchart B (450) illustrates a process for inferring one or more stylized section headings in an electronic document (ED). In particular, flowchart B (450) illustrates how the parent ACHP is generated in each iteration of traversing the style chain by the iterative style chain generation algorithm. In one or more embodiments, flowchart B (450) describes details of Step 412 of flowchart A (440) in above FIG. 4A. Flowchart B (450) may be performed in the multiple iterations of Steps 412, 413, and 414 of flowchart A (440). As used herein, the iteration of the flowchart B (450) refers to the particular iteration of Steps 412, 413, and 414 where flowchart B (450) is applied in the steps of flowchart A (440). One or more of the steps in FIG. 4B may be performed by the components of the system (100), discussed above in reference to FIG. 1. Furthermore, one or more of the steps shown in FIG. 4B may be omitted, repeated, and/or performed in a different order than the order shown in FIG. 4B. Accordingly, the scope of the invention should not be considered limited to the specific arrangement of steps shown in FIG. 4B.

Initially in Step 420, a determination is made as to whether any child chain fragment is generated in the immediate previous iteration and added to the style chain. In other words, the determination is made as to whether any additional candidate heading has been added to augment the style list. If the determination is positive, i.e., additional candidate heading(s) is added, the method proceeds to Step 421. If the determination is negative, i.e., no candidate heading is added, the method proceeds to Step 422.

In Step 421, based on the child chain fragment added in the immediate previous iteration to augment the style list, an ACHP in the additional candidate headings from the added child chain fragment in the style chain is selected as the parent ACHP in Step 412 of the current iteration. Accordingly, the child chain fragment added in the immediate previous iteration is a higher level fragment to any further child chain fragment that may be generated based on the parent ACHP of the current iteration selected herein. In this context, the iterative style chain generation algorithm is said to traverse the style chain from within a higher level chain fragment.

In Step 422, the next ACHP in the style chain subsequent to the parent ACHP of the immediate previous iteration is selected as the parent ACHP in Step 412 of the current iteration. In this context, the iterative style chain generation algorithm is said to traverse the style chain in a sequential manner.

In summary, based on the determination in Step 420, the iterative style chain generation algorithm may traverse the style chain from within a higher level chain fragment or traverse the style chain in a sequential manner.

Figure 4C:
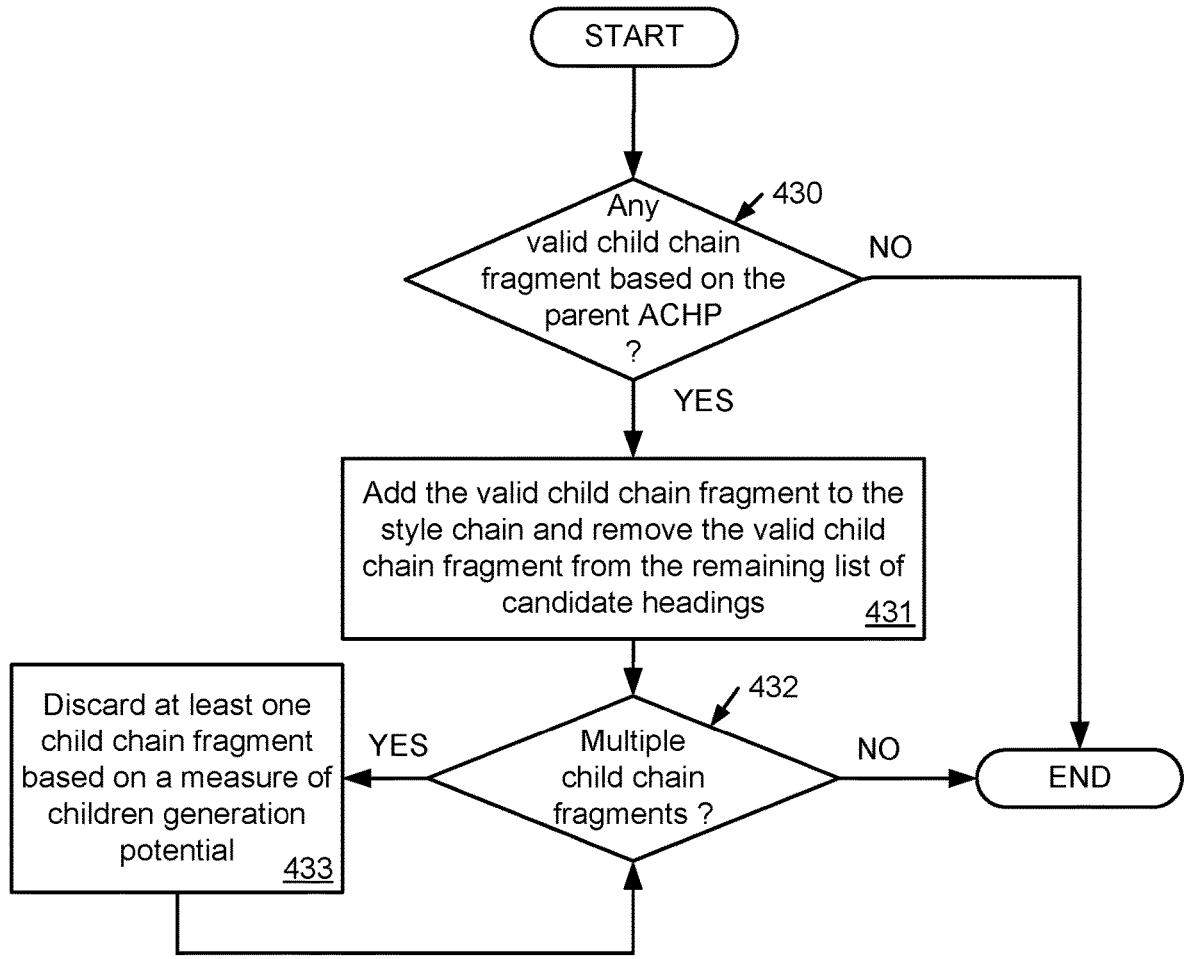

FIG. 4C shows a flowchart C (460) in accordance with one or more embodiments of the invention. Flowchart C (460) illustrates a process for inferring one or more stylized section headings in an electronic document (ED). In particular, flowchart C (460) illustrates how the child chain fragment is generated by the iterative style chain generation algorithm in each iteration of the algorithm. In one or more embodiments, flowchart C (460) describes details of Step 413 of the flowchart A (440) in above FIG. 4A. Flowchart C (460) may be performed in the multiple iterations of Steps 412, 413, and 414 of flowchart A (440). As used herein, the iteration of flowchart C (460) refers to the particular iteration of Steps 412, 413, and 414 where the flowchart C (460) is applied in the steps of flowchart A (440). One or more of the steps in FIG. 4C may be performed by the components of the system (100), discussed above in reference to FIG. 1. Furthermore, one or more of the steps shown in FIG. 4C may be omitted, repeated, and/or performed in a different order than the order shown in FIG. 4C. Accordingly, the scope of the invention should not be considered limited to the specific arrangement of steps shown in FIG. 4C.

Initially in Step 430, a determination is made as to whether any valid child chain fragment exists in-between the leading candidate heading and the trailing candidate heading of the parent ACHP. In one or more embodiments, the valid child chain fragment is a child chain segment of a same-point-size group where all paragraph numbers in the same-point-size group are in-between the leading paragraph number and the trailing paragraph number of the parent ACHP of the current iteration. In addition, the point size of the valid child chain fragment is less than or equal to the point size of the leading candidate heading of the parent ACHP of the current iteration.

If the determination is positive, i.e., a valid child chain fragment is identified in-between the leading paragraph number and the trailing paragraph number of the parent ACHP, the method proceeds to Step 421. If the determination is negative, i.e., no valid child chain fragment is identified in-between the leading paragraph number and the trailing paragraph number of the parent ACHP, the method ends.

In Step 431, the valid child chain fragment is added to the style chain and removed from the remaining list of candidate headings.

In Step 432, a determination is made as to whether multiple child chain fragments are identified between the leading paragraph number and the trailing paragraph number of the parent ACHP of the current iteration. If the determination is positive, i.e., multiple child chain fragments are identified, the method proceeds to Step 433. For example, in addition to the valid child chain fragment identified in Step 430 above, an alternative chain fragment is also identified that meets similar criteria of the valid child chain fragment. If the determination is negative, i.e., multiple child chain fragments are not identified, the method ends.

In Step 433, a measure of children generation potential is compared among multiple chain fragments identified in Step 432 above to generate a comparison result. Based on the comparison result, at least the aforementioned alternative chain fragment is discarded, returned to the list of candidate headings, and not added to the style chain. For example, the comparison result may indicate that the valid child chain fragment has higher children generation potential than the discarded alternative chain fragment.

As shown by FIGS. 2A, 2B, 4A, 4B, and 4C, one or more embodiments allow for computerized searching of an ED to return not only the matched phrase(s), but also the section(s) of the ED where the matched phrase(s) are found. Specifically, the section(s) of the ED are identified based on the sequence of section headings inferred using at least the iterative style chain generation algorithm described above. Thus, the user is able to view additional information related to the search phrase based on section headings semantically implied by the author that are not specified or explicitly identified using computer-recognizable information, such as tags or other identifiers, in the ED.

Based on the foregoing, an example of applying the methods described in reference to FIGS. 4A, 4B, and 4C is described below. Once the document content has been extracted into a common format, the process of identifying section headings begins. The first step in this process it to identify all potential headings in the document.

In one or more embodiments of the invention, if the electronic document provides information about headings, then these are harvested directly from the document and stored on a list of explicit headings. For example, HTML may specify specific heading tags, OOXML may specify a heading style, or PDF may specify an outline structure which can be mapped to paragraphs.

In addition to any explicit headings that may be present, a set of inferred headings in the document is also identified. This is done by accumulating point size statistics across all text in the document. A count of the number of characters for each point size in the document is recorded. This count is sorted by increasing point size. Starting from the smallest point size and continuing to the highest, a running total of all counts is kept. Once a particular percentage threshold is reached or surpassed, then the process stops and the point size at this point is recorded as the cutoff point size.

In one or more embodiments, only paragraphs with a point size greater than this cutoff point size are considered as candidate headings and only those paragraphs with a point size greater than or equal to this cutoff point size with leading sequence characters are considered as sequenced candidate headings. A sequenced candidate heading is a heading that has leading sequence characters, such as the candidate heading generated using the method and example described in reference to FIGS. 2A and 3C-3G above. As described above, sequenced candidate headings are obtained by regular expression pattern matching and may be broken up into one of 5 families below:
NUMERIC
UPPER CASE ROMAN
LOWER CASE ROMAN
UPPER CASE ALPHABETIC
LOWER CASE ALPHABETIC A stylized candidate heading is any candidate heading that does not have leading sequence characters. These are candidate headings because of their unique styling. In other words, a candidate heading is either a sequenced candidate heading or a stylized candidate heading.

For each candidate heading, the point size, paragraph number, and rank are stored. The rank of a candidate heading indicates the nesting level for that candidate heading. For example, a candidate heading starting with "3." is as rank 1 whereas a heading starting with "3.1" is at rank 2 while a heading starting with "3.1.1" is at rank 3 and so on. Hence, the rank represents the number of digit characters segregated by punctuation for sequenced candidate headings. For stylized candidate headings, the rank is set to −1. Explicit heading contain the rank specified in the ED, 1 otherwise. Candidate headings with the same point size are grouped together into a same-point-size group, referred to as style_headings_at_size. In other words, each same-point-size group is a group of candidate headings with a unique point size. As noted above, a chain fragment is one or more candidate headings that may be qualified as a portion of the sequence of section headings. In this context, each same-point-size group is a potential chain fragment with the unique point size. In other words, the corresponding style_headings_at_size form a potential chain fragment with the unique point size. In one or more embodiments, candidate headings in the ED are grouped into one or more collections of style_headings_at_size and sorted by point size to be stored in a list of candidate headings. Because sequenced candidate headings and stylized candidate headings are both based on a style attribute (i.e., point size exceeding or being equal to the cut off point size), in this context, the content of the list of candidate headings is referred to as style_candidate headings in the descriptions below. Specifically, the list of candidate headings is the collection of style_candidate headings.

Once candidate headings have been identified, the next step is to assemble them into chain fragments to form the sequence of section headings of the ED. Throughout the description below, assembling chain fragments is based on the iterative style chain generation algorithm. As described in reference to FIGS. 4A-4C above, the iterative style chain generation algorithm operates based on the style attribute (e.g., point size) such that chain fragments are iteratively generated and stored into a list of chain fragments, referred to as the style chain. An example pseudo code of the iterative style chain generation algorithm is described below where the variable sty_chain represents the style chain. An example of applying the iterative style chain generation algorithm to an ED is described in reference to FIGS. 5A-5C below.

The main loop of the example pseudo code of the iterative style chain generation algorithm is as below:

```
initialize sty_chain to an empty list of headings. This will
ultimately contain the final set of headings in the document.
add any explicit headings to sty_chain.
initialize cur_pos to the position of the first heading in
sty_chain, 0 if empty.
while (true){
    initialize end_bound to one less than the paragraph number
    of the next heading after cur_pos in sty_chain if present, 0
    otherwise.
    call the function add_headings (cur_pos, end_bound), keeping
    track if any headings were added.
    if (any headings were added), then:
        if (cur_pos is 0), set cur_pos to the paragraph number
        of the first heading in sty_chain, otherwise set
        cur_pos to the paragraph number of the next heading
        after cur_pos.
    else if (end_bound is not zero), then:
        set cur_pos to end_bound + 1
    otherwise exit the loop
}
if there are no or multiple candidate headings in sty_chain at
the most significant rank (lowest), then:
    it is possible the main title was missed; call the function
    find_main_title( ) to look for a main title.
call the function remove_lists( ) to remove any lists that were
inadvertently added.
```

The function add_headings( ) may be expanded as:

```
bool add_headings(unsigned start_pos, unsigned end_pos){
    identify a pointer to the parent heading as the heading in
    sty_chain at start_pos if present, null otherwise.
    call the function find_candidate heading_chains(start_pos,
    end_pos, parent, false) which returns a list of all full
    heading chains per point size that could fit between
    start_pos and end_pos.
    select the best chain among the candidate headings by
    calling select_best1( )
    if a best chain has been found:
        add it to sty_chain as one rank higher than the parent
        if present (0 otherwise), remove the corresponding
        entries from style_candidate headings, and return
        true.
    Otherwise:
        return false.
}
```

The function find_candidate heading_chains(start_pos, end_pos, parent, first_only) may be expanded as:

```
identify a threshold point size as the point size of the parent
if present, 0 otherwise.
identify the style_headings_at_size at the end of style_candidate
headings.
if a threshold point size has been set, then traverse backwards
in style_candidate headings until a style_headings_at_size with a
point size less than or equal to pt_size_thresh has been found.
create an empty list of chains per point size.
repeat with the remainder of all style_headings_at_size in style_
candidate headings by decreasing point size pt_size:
    create an empty candidate heading chain at pt_size.
    for all candidate headings in the current
    style_headings_at_size:
        if the candidate heading's paragraph number is greater
        than start_pos and (the candidate heading's paragraph
        number is less than end_pos or end_pos is 0) then add
        the candidate heading to the candidate heading chain.
        if first_only is true, return. Only the first heading
        in the chain is desired.
    find the most significant rank (lowest) in the candidate
    heading chain and remove any candidate headings with a rank
    of lesser (higher) significance.
    if the first candidate heading in the chain is a sequenced
    candidate heading, then remove all sequenced candidate
    headings that are of a different family than the first.
    remove any candidate headings that are between adjacent
    sequenced candidate headings.
    call the function chain_is_valid( ) to determine if the chain
    is valid. If so, add it to the list of chains at pt_size.
return the list of chains
```

The function chain_is_valid( ) may be expanded as:

```
if the chain is empty, return false
if the first candidate heading in the chain is not a starting
point, return false. Any stylized candidate heading can be a
starting point. A sequenced candidate heading can be a starting
point only if the right most character in the sequence is
numerically equivalent to 1 (e.g. 3.4.1, a) i.)
if a parent has been identified and the first candidate heading
in the chain does not logically follow the parent, return false.
Any stylized candidate heading can logically follow any other
candidate heading. A sequenced candidate heading can follow any
stylized candidate heading but can only follow another sequenced
candidate heading if it makes one increment if they are of the
same family or if it is a starting point otherwise (e.g. 1.2.1
follows 1.2, 1.3 follows 1.2, and a) follows 1.2 whereas 1.2.3
does not follow 1.2, 1.4 does not follow 1.2, and c) does not
follow 1.2)
```

-continued

```
if the majority of candidate headings in the chain are sequenced
candidate headings and if all subsequent sequenced candidate
headings do not logically follow the previous, then return false.
return true.
```

The function select_best1( ) may be expanded as:

```
for every chain in the list of chains starting with the largest
point size and continuing in reverse order to the smallest point
size:
    if a parent has been identified and parent is a sequenced
    candidate heading and the first entry in the chain (child) is
    a sequenced candidate heading, then:
        select the current chain as best and exit the loop
    else:
        get an estimate of the number of children of a smaller
        point size this chain could have, keeping track of the
        highest estimate yet encountered as best.
return the chain identified as best.
```

The function find_main_title( ) may be expanded as:

```
identify the first position in chain, first_in_chain, as the
position of the first heading in sty_chain if non-empty,
otherwise the number of paragraphs in the document.
call the function find_candidate heading_chains (0,
first_in_chain, null, true) which returns a list of all first
heading only chains per point size that could fit at the
beginning of the document.
throw away chains that are composed entirely of sequenced
candidate headings or with point sizes equal to the cutoff point
size.
score the remaining chains based on select criteria and choose
the best score. For example, a score can be computed based on
how close the heading's page is to the first page in the document
(closer the better) or how large the point size of the candidate
heading is (the larger the better). There are multiple ways to
score candidate headings and no exact way is perfect for a given
domain.
demote the rank of all headings in sty_chain and add in the best
candidate heading's headings.
```

The function remove_lists( ) may be expanded as:

```
identify the least significant rank, lsr, in sty_chain.
identify the most significant rank, msr, in sty_chain.
for each r from lsr to msr:
    identify all adjacent headings at rank r in sty_chain.
    if all paragraph numbers of all adjacent headings are also
    adjacent and (either the next heading in sty_chain has a rank
    lower than r or (there is no next heading and there are no
    paragraphs after the last adjacent heading)) then remove the
    group of adjacent headings.
```

FIGS. 5A-5C show an implementation example in accordance with one or more embodiments of the invention. Specifically, FIG. 5A, FIG. 5B, and FIG. 5C show ED portion A (500a), ED portion B (500b), and ED portion C (500c), respectively, as three consecutive portions of an ED (500). The implementation example described in reference to FIGS. 5A-5C is based on the system and method flowchart described in reference to FIGS. 1, 4A, 4B, and 4C above. In one or more embodiments of the invention, one or more of elements shown in FIGS. 5A-5C may be omitted, repeated, and/or organized in a different arrangement. Accordingly, the scope of the invention should not be considered limited to the specific arrangement of elements shown in FIGS. 5A-5C.

In the ED (500), each paragraph is associated with a corresponding paragraph number. For example, in ED portion A (500*a*), paragraph A (510*a*) is shown as paragraph number A (522*a*) and has a numerical value "1". Similarly, paragraph B (510*b*) has the numerical value "5", paragraph C (510*c*) has the numerical value "9", paragraph D (510*d*) has the numerical value "11", etc. In ED portion B (500*b*), paragraph E (510*e*) has the numerical value "15", paragraph F (510*f*) has the numerical value "20", paragraph G (510*g*) has the numerical value "23", etc. In ED portion C (500*c*), paragraph H (510*h*) has the numerical value "35", etc. To derive the sequence of section headings of the ED (500), the first step is to identify any explicit headings in the document. In the example, the following explicit headings are identified based on heading styling embedded in the document:

| Paragraph Number | Leading Text |
|---|---|
| 5 | Feeding Habits |
| 23 | Mating Habits |
| 35 | References |

The next step is to assemble a list of inferred candidate headings. As part of this process, the following point sizes and associated character counts are found in the ED (500):

| Document Point Size | Number of Characters at Point Size |
|---|---|
| 10 | 63 |
| 11 | 7657 |
| 12 | 58 |
| 14 | 25 |
| 16 | 226 |
| 24 | 37 |
| 36 | 23 |

In the statistical distribution of point size above, there are 63 characters at 10 points, 7657 characters at 11 points, 58 characters at 12 points, etc. Using a point size threshold based on 80% of the total characters, the point size threshold is surpassed at 11 points. Because (63+7657)/(63+7657+58+25+226+37+23)=7720/8089=0.95, 11 points is the first point size in the statistical distribution that pushes the percentage of characters greater than or equal to 0.8, or 80%. Accordingly, the point size threshold or cutoff point size in the ED (500) is set at 11 points. TABLE 8 shows the list of candidate headings containing all style_candidate headings, which are paragraphs having point sizes greater than the point size threshold.

TABLE 8

| Point Size | Paragraph Number | Rank | Leading Text |
|---|---|---|---|
| 12 | 37 | 1 | 1. Wikipedia |
| | 38 | 1 | 2. John's Field Notes |
| | 39 | 1 | 3. Jeff's Prior Research |
| 14 | 30 | −1 | With Chicks |
| | 32 | −1 | Without Chicks |
| 16 | 2 | −1 | Research Done in Field by Mr. Bird W . . . |
| | 3 | −1 | Wyoming Prairie |
| | 4 | −1 | June 2019 |
| | 9 | 1 | 1. Northern Territory Feeding Habits . . . |
| | 11 | 1 | a. Northwestern Territory |
| | 15 | 1 | b. Northeastern Territory |
| | 20 | 1 | 2. Southern Territory Feeding Habits . . . |

TABLE 8-continued

| Point Size | Paragraph Number | Rank | Leading Text |
|---|---|---|---|
| | 24 | −1 | Early season |
| | 26 | −1 | Male Plumage |
| | 29 | −1 | Female Plumage |
| 36 | 1 | −1 | The Western Sage Grouse |

Now that inferred candidate headings have been identified, the next step is to start assembling them into a style chain using the iterative style chain generation algorithm described above. In this example, the style chain is initialized with the set of explicit headings as shown in TABLE 9 below. Note that the rank of each explicit heading is initialized as "1" and that two adjacent candidate heading pairs (ACHP) exists, one ACHP formed by paragraphs 5 and 23 and another ACHP formed by paragraphs 23 and 35.

TABLE 9

| Style Chain | | |
|---|---|---|
| Paragraph Number | Rank | Leading Text |
| 5 | 1 | Feeding Habits |
| 23 | 1 | Mating Habits |
| 35 | 1 | References |

Using the iterative style chain generation algorithm, cur_pos is initialized to 5 and end_bound is initialized to 22 based on the parent ACHP formed by paragraphs 5 and 23. The iterative style chain generation algorithm then proceeds to look for headings between paragraphs 5 and 22 by calling add_headings(5, 22).

Within add_headings( ), the parent is identified as paragraph 5 ("Feeding Habits") and the function find_candidate_heading_chains(5, 22, parent, false) is called.

Within find_candidate_heading_chains( ), the threshold point size is identified as 24, which is the point size of the parent. As a result, the iterative style chain generation algorithm only looks for children headings with a point size of 24 or less. This function first identifies candidate headings at 16 points that fit between 5 and 22. These headings are initially set to paragraphs 9, 11, 15, and 20. However, this initial set is validated to just paragraphs 9 and 20 because paragraphs 11 and 15 are between adjacent sequenced candidate headings at paragraphs 9 and 20. This process continues with candidate headings at decreasing point sizes 14 and 12 but no other candidate headings are found. Hence, this function returns the following list of potential chain fragments:

| Point Size | Paragraph Number | Leading Text |
|---|---|---|
| 16 | 9 | 1. Northern Territory Feeding Habits . . . |
| | 20 | 2. Southern Territory Feeding Habits . . . |

The best chain from the list is selected but given that there is only 1, the chain at 16 points is chosen and the candidate headings are selected as the child chain fragment and added to the style chain shown in TABLE 10 below. The added child segment is assigned the rank as one more than the rank of the parent, which is paragraph 5 at rank "1."

TABLE 10

Style Chain

| Paragraph Number | Rank | Leading Text |
|---|---|---|
| 5 | 1 | Feeding Habits |
| 9 | 2 | 1. Northern Territory Feeding Habits . . . |
| 20 | 2 | 2. Southern Territory Feeding Habits . . . |
| 23 | 1 | Mating Habits |
| 35 | 1 | References |

The corresponding headings in the style_candidate_headings are removed to result in the remaining list of candidate headings shown in TABLE 11 below.

TABLE 11

| Point Size | Paragraph Number | Rank | Leading Text |
|---|---|---|---|
| 12 | 37 | 1 | 1. Wikipedia |
|  | 38 | 1 | 2. John's Field Notes |
|  | 39 | 1 | 3. Jeff's Prior Research |
| 14 | 30 | −1 | With Chicks |
|  | 32 | −1 | Without Chicks |
| 16 | 2 | −1 | Research Done in Field by Mr. Bird W . . . |
|  | 3 | −1 | Wyoming Prairie |
|  | 4 | −1 | June 2019 |
|  | 11 | 1 | a. Northwestern Territory |
|  | 15 | 1 | b. Northeastern Territory |
|  | 24 | −1 | Early season |
|  | 26 | −1 | Male Plumage |
|  | 29 | −1 | Female Plumage |
| 36 | 1 | −1 | The Western Sage Grouse |

Finally, true is returned since headings were added.

Since headings were added, cur_pos gets set to 9 and the iterative style chain generation algorithm repeats with another iteration of the loop. In this iteration based on the ACHP formed by paragraphs 9 and 20, end_bound is set to 19. The iterative style chain generation algorithm then proceeds to look for headings between paragraphs 9 and 19 by calling add_headings(9, 19).

Within add_headings( ), the parent is identified as paragraph 9 and the function find_candidate heading_chains(9, 19, parent, false) is called.

Within find_candidate heading_chains( ), the threshold point size is identified as 16 and the following list of potential chains are identified:

| Point Size | Paragraph Number | Leading Text |
|---|---|---|
| 16 | 11 | a. Northwestern Territory |
|  | 15 | b. Northeastern Territory |

The best chain from the list is selected but given that there is only 1, the chain at 16 points is chosen and the candidate headings are selected as the child chain fragment and added to the style chain shown in TABLE 12 below. Adding this child chain fragment creates two additional ACHPs in the style chain, the first additional ACHP formed by paragraphs 11 and 15 and the second additional ACHP formed by paragraphs 15 and 20. Furthermore, the added child segment is assigned the rank as one more than the rank of the parent, which is paragraph 9 at rank "2".

TABLE 12

Style Chain

| Paragraph Number | Rank | Leading Text |
|---|---|---|
| 5 | 1 | Feeding Habits |
| 9 | 2 | 1. Northern Territory Feeding Habits . . . |
| 11 | 3 | a. Northwestern Territory |
| 15 | 3 | b. Northeastern Territory |
| 20 | 2 | 2. Southern Territory Feeding Habits . . . |
| 23 | 1 | Mating Habits |
| 35 | 1 | References |

The corresponding headings in the style_candidate headings are removed to result in the remaining list of candidate headings shown in TABLE 13 below.

TABLE 13

| Point Size | Paragraph Number | Rank | Leading Text |
|---|---|---|---|
| 12 | 37 | 1 | 1. Wikipedia |
|  | 38 | 1 | 2. John's Field Notes |
|  | 39 | 1 | 3. Jeff's Prior Research |
| 14 | 30 | −1 | With Chicks |
|  | 32 | −1 | Without Chicks |
| 16 | 2 | −1 | Research Done in Field by Mr. Bird W . . . |
|  | 3 | −1 | Wyoming Prairie |
|  | 4 | −1 | June 2019 |
|  | 24 | −1 | Early season |
|  | 26 | −1 | Male Plumage |
|  | 29 | −1 | Female Plumage |
| 36 | 1 | −1 | The Western Sage Grouse |

Finally, true is returned since headings were added.

Since headings were added, cur_pos gets set to 11 and the iterative style chain generation algorithm repeats with another iteration of the loop. In this iteration based on the ACHP formed by paragraph 11 and paragraph 15, end_bound is set to 14. The iterative style chain generation algorithm then proceeds to look for headings between paragraphs 11 and 14 by calling add_headings(11, 14).

Within add_headings( ), the parent is identified as paragraph 11 and the function find_candidate heading_chains (11, 14, parent, false) is called. In this case, no candidate heading chains are found and false is returned.

Since no headings were added and end_bound is not zero, cur_pos get set to 15 (value of end_bound+1) and the iterative style chain generation algorithm repeats with another iteration of the loop. In this iteration, end_bound is set to 19. The iterative style chain generation algorithm then proceeds to look for headings between paragraphs 15 and 19 and again finds none. In other words, the parent ACHP for this iteration is formed by paragraphs 15 and 20, which is the next ACHP in the style chain subsequent to the parent ACHP of the immediate previous iteration and formed by paragraph 11 and paragraph 15. This is repeated for the next scan between paragraphs 20 and 22 as well.

On the scan between paragraphs 23 and 34 based on the ACHP formed by paragraphs 23 and 35, the iterative style chain generation algorithm calls add_headings(23, 34).

Within add_headings( ), the parent is identified as paragraph 23 and the function find_candidate_heading_chains (23, 34, parent, false) is called.

Within find_candidate_heading_chains( ), the threshold point size is identified as 24 and the following list of potential chains are identified:

| Point Size | Paragraph Number | Leading Text |
|---|---|---|
| 16 | 24 | Early season |
|  | 26 | Male Plumage |
|  | 29 | Female Plumage |
| 14 | 30 | With Chicks |
|  | 32 | Without Chicks |

Now that there are multiple candidate heading chains (one at 16 points, the other at 14 points), the iterative style chain generation algorithm decides which to choose as the best for the child chain fragment. The function select_best1( ) is called.

Within select_best1( ), the iterative style chain generation algorithm selects the chain that maximizes the number of future potential children at a smaller point size. The first chain at 16 points is selected. Of the remaining headings in style_candidate_headings, the chain at 16 points may possibly have children at paragraphs 30 and 32 for a total of 2 children. The chain at 14 points does not possibly have any children. Hence, the chain at 16 points is selected as best.

The best candidate headings are selected as the child fragment and added to the style chain shown in TABLE 14 below. The added child segment is assigned the rank as one more than the rank of the parent, which is paragraph 23 at rank "1".

TABLE 14

Style Chain

| Paragraph Number | Rank | Leading Text |
|---|---|---|
| 5 | 1 | Feeding Habits |
| 9 | 2 | 1. Northern Territory Feeding Habits . . . |
| 11 | 3 | a. Northwestern Territory |
| 15 | 3 | b. Northeastern Territory |
| 20 | 2 | 2. Southern Territory Feeding Habits . . . |
| 23 | 1 | Mating Habits |
| 24 | 2 | Early season |
| 26 | 2 | Male Plumage |
| 29 | 2 | Female Plumage |
| 35 | 1 | References |

The corresponding headings in the style_candidate headings are removed to result in the remaining list of candidate headings shown in TABLE 15 below.

TABLE 15

| Point Size | Paragraph Number | Rank | Leading Text |
|---|---|---|---|
| 12 | 37 | 1 | 1. Wikipedia |
|  | 38 | 1 | 2. John's Field Notes |
|  | 39 | 1 | 3. Jeff's Prior Research |
| 14 | 30 | −1 | With Chicks |
|  | 32 | −1 | Without Chicks |
| 16 | 2 | −1 | Research Done in Field by Mr. Bird W . . . |
|  | 3 | −1 | Wyoming Prairie |
|  | 4 | −1 | June 2019 |
| 36 | 1 | −1 | The Western Sage Grouse |

Finally, true is returned since headings were added.

The iterative style chain generation algorithm repeats in this manner until all headings in style chain have been traversed. At the end of the loop, there is no ACHP in the style chain that has not been traverse where the style chain is shown in TABLE 16 below.

TABLE 16

Style Chain

| Paragraph Number | Rank | Leading Text |
|---|---|---|
| 5 | 1 | Feeding Habits |
| 9 | 2 | 1. Northern Territory Feeding Habits . . . |
| 11 | 3 | a. Northwestern Territory |
| 15 | 3 | b. Northeastern Territory |
| 20 | 2 | 2. Southern Territory Feeding Habits . . . |
| 23 | 1 | Mating Habits |
| 24 | 2 | Early season |
| 26 | 2 | Male Plumage |
| 29 | 2 | Female Plumage |
| 30 | 3 | With Chicks |
| 32 | 3 | Without Chicks |
| 35 | 1 | References |
| 37 | 2 | 1. Wikipedia |
| 38 | 2 | 2. John's Field Notes |
| 39 | 2 | 3. Jeff's Prior Research |

The style_candidate headings in the remaining list of candidate headings is shown in TABLE 17 below.

TABLE 17

| Point Size | Paragraph Number | Rank | Leading Text |
|---|---|---|---|
| 16 | 2 | −1 | Research Done in Field by Mr. Bird W . . . |
|  | 3 | −1 | Wyoming Prairie |
|  | 4 | −1 | June 2019 |
| 36 | 1 | −1 | The Western Sage Grouse |

The iterative style chain generation algorithm now attempts to look for a main title. First, the number of headings at the most significant rank (rank "1") is counted and determined to be 3. Since this value is not 1, the function find_main_title( ) is called.

Within find_main_title( ), first_in_chain is identified as 5 and find_candidate_heading_chains(0, 5, null, true) is called.

Within find_candidate_heading_chains( ), the threshold point size is identified as 0 (no threshold) and the following list of potential headings are identified:

| Point Size | Paragraph Number | Leading Text |
|---|---|---|
| 16 | 2 | Research Done in Field by Mr. Bird W . . . |
| 36 | 1 | The Western Sage Grouse |

Both candidate headings are validated as not consisting entirely of sequenced headings with point sizes larger than the cutoff point size. Hence, various criteria are used to score the candidate headings to determine which is better. For this example, the first one with the largest point size is selected. Hence, paragraph number 1 is selected and added to sty_chain as shown in TABLE 18 below. Note that the paragraph 1 is assigned the rank "1" as the main title and the rank of each candidate heading in TABLE 16 is incremented by 1 in TABLE 18.

TABLE 18

Style Chain

| Paragraph Number | Rank | Leading Text |
|---|---|---|
| 1 | 1 | The Western Sage Grouse |
| 5 | 2 | Feeding Habits |
| 9 | 3 | 1. Northern Territory Feeding Habits . . . |
| 11 | 4 | a. Northwestern Territory |
| 15 | 4 | b. Northeastern Territory |
| 20 | 3 | 2. Southern Territory Feeding Habits . . . |
| 23 | 2 | Mating Habits |
| 24 | 3 | Early season |
| 26 | 3 | Male Plumage |
| 29 | 3 | Female Plumage |
| 30 | 4 | With Chicks |
| 32 | 4 | Without Chicks |
| 35 | 2 | References |
| 37 | 3 | 1. Wikipedia |
| 38 | 3 | 2. John's Field Notes |
| 39 | 3 | 3. Jeff's Prior Research |

Finally, the function remove_lists( ) is called to remove any lists that were inadvertently added. A list is defined as one or more adjacent headings with no children. In this example, paragraphs 37-39 comprise a list.

Within remove_lists( ), lsr is identified as 4 and msr is identified as 1. This then repeats for each r from 4 to 1 as below:
2 sets of adjacent headings at rank 4 are identified:
Paragraphs 11 and 15
Paragraphs 30 and 32
In neither case are the paragraph numbers themselves adjacent, so nothing is removed.
2 sets of adjacent headings at rank 3 are identified:
Paragraphs 24, 26, and 29
Paragraphs 37, 38, and 39
For the latter, the iterative style chain generation algorithm determines that paragraphs 37, 38, and 39 are also adjacent and that there are no headings nor paragraphs after paragraph 39 and so this latter set is removed from sty_chain to result in the style chain shown in TABLE 19 below.

TABLE 19

Style Chain

| Paragraph Number | Rank | Leading Text |
|---|---|---|
| 1 | 1 | The Western Sage Grouse |
| 5 | 2 | Feeding Habits |
| 9 | 3 | 1. Northern Territory Feeding Habits . . . |
| 11 | 4 | a. Northwestern Territory |
| 15 | 4 | b. Northeastern Territory |
| 20 | 3 | 2. Southern Territory Feeding Habits . . . |
| 23 | 2 | Mating Habits |
| 24 | 3 | Early season |
| 26 | 3 | Male Plumage |
| 29 | 3 | Female Plumage |
| 30 | 4 | With Chicks |
| 32 | 4 | Without Chicks |
| 35 | 2 | References |

No more adjacent headings are identified at ranks 2 and 1 and the function returns.

The iterative style chain generation algorithm completes the style chain containing the set of titles and nested headings within the electronic document ED (500). Specifically, the style chain shown in TABLE 19 above includes the sequence of section headings of the ED (500) with the inferred main title. While paragraphs included in TABLE 8 through TABLE 18 are referred to as stylized candidate headings and sequenced candidate headings, upon completing all iterations of the iterative style chain generation algorithm, the paragraphs included in TABLE 19 are referred to as stylized section headings and sequenced section headings that collectively form the sequence of section headings. While the sequenced section headings generated using the method of FIG. 2A is not based on any point size attribute, the sequenced section headings generated using the method of FIG. 4A and included in TABLE 19 are qualified based at least on the aforementioned point size threshold.

Figure 6:
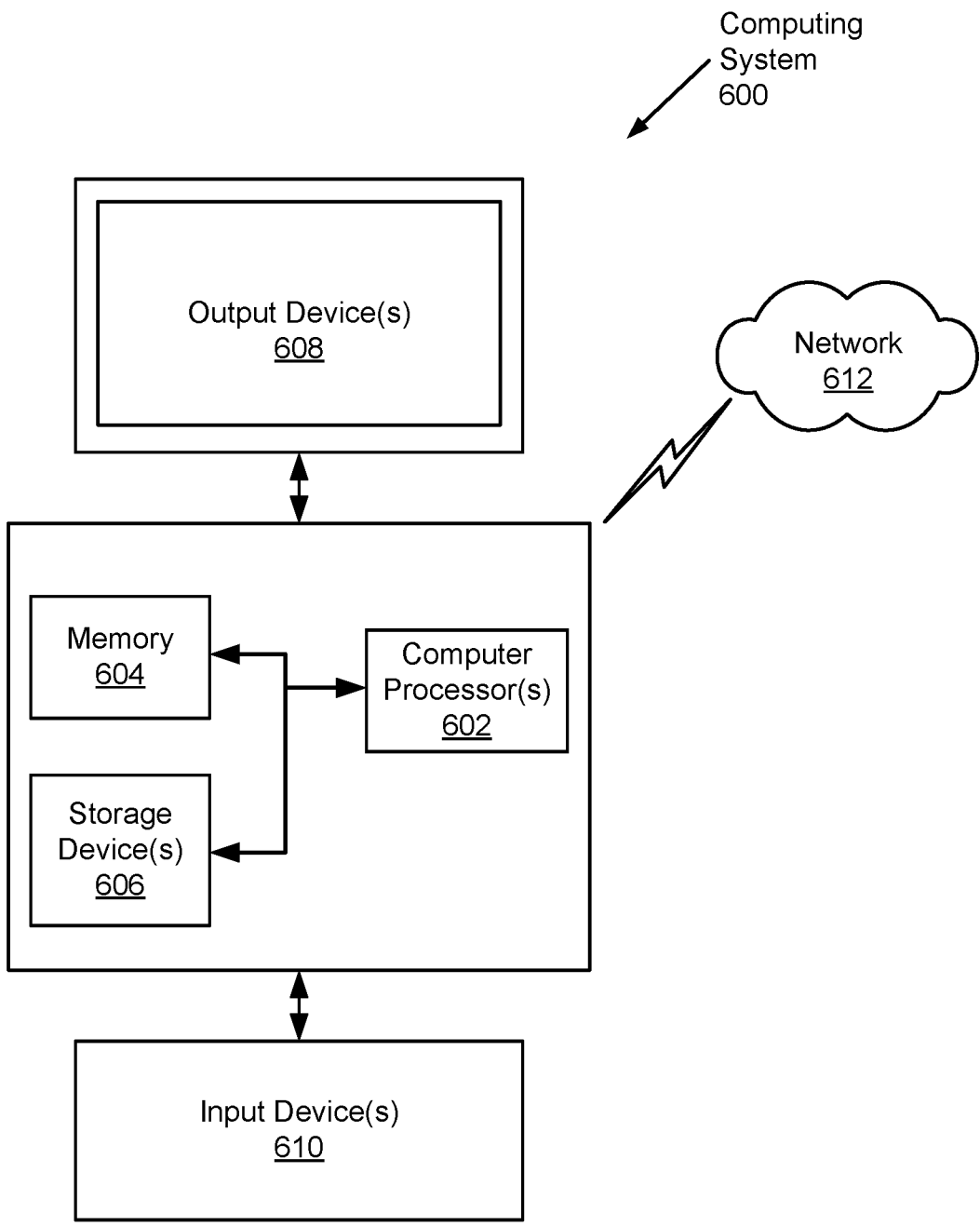
FIG. 6 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and be connected to the other elements over a network (612). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing an electronic document (ED) to infer a sequence of section headings in the ED, the method comprising:
    generating, by a computer processor and based on a statistical distribution of point sizes of a plurality of characters in the ED, a list of candidate headings in the ED, each candidate heading corresponding to a paragraph in the ED, wherein
        the list of candidate headings comprises a plurality of same-point-size groups,
        each of the same-point-size groups correspond to a unique point size, and
        the ED comprises at least three candidate headings;
    adding, by the computer processor, an initial chain fragment from the list of candidate headings to initialize a style chain, wherein the initial chain fragment is removed from the list of candidate headings subsequent to the adding;
    iteratively augmenting, based on an iterative style chain generation algorithm, the style chain to include a plurality of chain fragments, comprising:
        generating, during a first iteration among a plurality of iterations of the iterative style chain generation algorithm, a first chain fragment among the plurality of chain fragments from a first same-point-size group among the plurality of same-point-size groups, wherein
            the first chain fragment comprises a parent adjacent candidate heading pair (ACHP) for a second iteration among the plurality of iterations, and
            the first chain fragment is added to the style chain and removed from the list of candidate headings; and
        generating, during the second iteration subsequent to the first iteration, a second chain fragment among the plurality of chain fragments from a second same-point-size group among the plurality of same-point-size groups, wherein
            the second chain fragment is bounded by the parent ACHP for the second iteration,
            the second chain fragment is added to the style chain and removed from the list of candidate headings,
            the unique point size of the second same-point-size group is less than or equal to the unique point size of the first same-point-size group, and
            the style chain comprises at least two but not all candidate headings; and
    generating, by the computer processor and based at least on the plurality of chain fragments of the style chain, the sequence of section headings.

2. The method of claim 1, wherein
    generating the first chain fragment during the first iteration comprises:
        selecting a first current position and a first end bound from a first plurality of paragraph numbers in the style chain;
        selecting, based on the first current position and the first end bound, the first chain fragment from the list of candidate headings, and
        removing, prior to the second iteration and in response to selecting the first chain fragment, at least the first chain fragment from the list of candidate headings to generate a remaining list of candidate headings; and
    generating the second chain fragment during the second iteration comprises:
        selecting a second current position and a second end bound from a second plurality of paragraph numbers in the style chain;
        selecting, based on the second current position and the second end bound, the second chain fragment from the remaining list of candidate headings.

3. The method of claim 2, wherein generating the second chain fragment during the second iteration further comprises:
    identifying an alternative chain fragment based on an alternative same-point-size group from the plurality of same-point-size groups, wherein
        the alternative chain fragment is bounded by the parent ACHP in the first chain fragment, and
        the unique point size of the alternative same-point-size group is less than or equal to the unique point size of the first same-point-size group;
    comparing a measure of children generation potential between the second chain fragment and the alternative chain fragment to generate a comparison result; and
    discarding the alternative chain fragment based on the comparison result.

4. The method of claim 2, where selecting the second current position and the second end bound comprises:
    identifying the second current position and the second end bound based on a leading paragraph number and a trailing paragraph number of the parent ACHP for the second iteration.

5. The method of claim 4, wherein
    the second iteration follows the first iteration without any intervening iteration,
    the second current position equals the leading paragraph number of the parent ACHP for the second iteration, and
    the second end bound equals one less than the trailing paragraph number of the parent ACHP for the second iteration.

6. The method of claim 4, wherein
    the second iteration is preceded by an intervening iteration that follows the first iteration and results in no additional chain fragment, the intervening iteration being based on an intervening current position and an intervening end bound,
    the second current position equals one plus the intervening end bound, and
    the second end bound equals one less than the trailing paragraph number of the parent ACHP for the second iteration.

7. The method of claim 1, further comprising:
    identifying, in the ED, one or more explicit section heading, a plurality of stylized candidate headings, and a plurality of sequenced candidate headings, wherein the style chain comprises the one or more explicit section heading prior to adding the initial chain fragment to the style chain, and the list of candidate headings comprises the plurality of stylized candidate headings and the plurality of sequenced candidate headings.

8. The method of claim 1, further comprising:

identifying a main title of the ED based on the sequence of section heading.

9. A non-transitory computer readable medium (CRM) storing computer readable program code for processing an electronic document (ED) to infer a sequence of section headings in the ED embodied therein, wherein the computer readable program code, when executed by a computer, comprises functionality for:

generating, based on a statistical distribution of point sizes of a plurality of characters in the ED, a list of candidate headings in the ED, each candidate heading corresponding to a paragraph in the ED, wherein
  the list of candidate headings comprises a plurality of same-point-size groups,
  each of the same-point-size groups corresponding to a unique point size, and
  the ED comprises at least three candidate headings;

adding, an initial chain fragment from the list of candidate headings to initialize a style chain, wherein the initial chain fragment is removed from the list of candidate headings subsequent to the adding;

iteratively augmenting, based on an iterative style chain generation algorithm, the style chain to include a plurality of chain fragments, comprising:
  generating, during a first iteration among a plurality of iterations of the iterative style chain generation algorithm, a first chain fragment among the plurality of chain fragments from a first same-point-size group among the plurality of same-point-size groups, wherein
    the first chain fragment comprises a parent adjacent candidate heading pair (ACHP) for a second iteration among the plurality of iterations,
    the first chain fragment is added to the style chain and removed from the list of candidate headings; and
  generating, during the second iteration subsequent to the first iteration, a second chain fragment among the plurality of chain fragments from a second same-point-size group among the plurality of same-point-size groups, wherein
    the second chain fragment is bounded by the parent ACHP for the second iteration,
    the second chain fragment is added to the style chain and removed from the list of candidate headings,
    the unique point size of the second same-point-size group is less than or equal to the unique point size of the first same-point-size group, and
    the style chain comprises at least two but not all candidate headings; and generating, based at least on the plurality of chain fragments of the style chain, the sequence of section headings.

10. The non-transitory CRM of claim 9, wherein generating the first chain fragment during the first iteration comprises:

selecting a first current position and a first end bound from a first plurality of paragraph numbers in the style chain;

selecting, based on the first current position and the first end bound, the first chain fragment from the list of candidate headings, and removing, prior to the second iteration and in response to selecting the first chain fragment, at least the first chain fragment from the list of candidate headings to generate a remaining list of candidate headings; and generating the second chain fragment during the second iteration comprises:

selecting a second current position and a second end bound from a second plurality of paragraph numbers in the style chain;

selecting, based on the second current position and the second end bound, the second chain fragment from the remaining list of candidate headings.

11. The non-transitory CRM of claim 10, wherein generating the second chain fragment during the second iteration further comprises:

identifying an alternative chain fragment based on an alternative same-point-size group from the plurality of same-point-size groups, wherein
  the alternative chain fragment is bounded by the parent ACHP in the first chain fragment, and
  the unique point size of the alternative same-point-size group is less than or equal to the unique point size of the first same-point-size group;

comparing a measure of children generation potential between the second chain fragment and the alternative chain fragment to generate a comparison result; and discarding the alternative chain fragment based on the comparison result.

12. The non-transitory CRM of claim 10, where selecting the second current position and the second end bound comprises:

identifying the second current position and the second end bound based on a leading paragraph number and a trailing paragraph number of the parent ACHP for the second iteration.

13. The non-transitory CRM of claim 12, wherein the second iteration follows the first iteration without any intervening iteration, the second current position equals the leading paragraph number of the parent ACHP for the second iteration, and the second end bound equals one less than the trailing paragraph number of the parent ACHP for the second iteration.

14. The non-transitory CRM of claim 12, wherein the second iteration is preceded by an intervening iteration that follows the first iteration and results in no additional chain fragment, the intervening iteration being based on an intervening current position and an intervening end bound, the second current position equals one plus the intervening end bound, and the second end bound equals one less than the trailing paragraph number of the parent ACHP for the second iteration.

15. A system for processing an electronic document (ED) to infer a sequence of section headings in the ED, the system comprising:

a memory; and a computer processor connected to the memory and configured to:

generate, based on a statistical distribution of point sizes of a plurality of characters in the ED, a list of candidate headings in the ED, each candidate heading corresponding to a paragraph in the ED, wherein the list of candidate headings comprises a plurality of same-point-size groups,
    each of the same-point-size groups correspond to a unique point size, and
    the ED comprises at least three candidate headings;
add an initial chain fragment from the list of candidate headings to initialize a style chain, wherein the initial chain fragment is removed from the list of candidate headings subsequent to the adding;
iteratively augment, based on an iterative style chain generation algorithm, the style chain to include a plurality of chain fragments, comprising:
    generating, during a first iteration among a plurality of iterations of the iterative style chain generation algorithm, a first chain fragment among the plurality of chain fragments from a first same-point-size group among the plurality of same-point-size groups, wherein
        the first chain fragment comprises a parent adjacent candidate heading pair (ACHP) for a second iteration among the plurality of iterations, and
        the first chain fragment is added to the style chain and removed from the list of candidate headings; and
    generating, during the second iteration subsequent to the first iteration, a second chain fragment among the plurality of chain fragments from a second same-point-size group among the plurality of same-point-size groups, wherein
        the second chain fragment is bounded by the parent ACHP for the second iteration,
        the second chain fragment is added to the style chain and removed from the list of candidate headings,
        the unique point size of the second same-point-size group is less than or equal to the unique point size of the first same-point-size group, and
        the style chain comprises at least two but not all candidate headings; and generate, based at least on the plurality of chain fragments of the style chain, the sequence of section headings.

16. The system of claim 15, wherein
generating the first chain fragment during the first iteration comprises:
    selecting a first current position and a first end bound from a first plurality of paragraph numbers in the style chain;
    selecting, based on the first current position and the first end bound, the first chain fragment from the list of candidate headings, and
    removing, prior to the second iteration and in response to selecting the first chain fragment, at least the first chain fragment from the list of candidate headings to generate a remaining list of candidate headings; and
generating the second chain fragment during the second iteration comprises:
    selecting a second current position and a second end bound from the first plurality of paragraph numbers in the style chain;
    selecting, based on the second current position and the second end bound, the second chain fragment from the remaining list of candidate headings.

17. The system of claim 16, wherein generating the second chain fragment during the second iteration further comprises:
    identifying an alternative chain fragment based on an alternative same-point-size group from the plurality of same-point-size groups, wherein
        the alternative chain fragment is bounded by the parent ACHP in the first chain fragment, and
        the unique point size of the alternative same-point-size group is less than or equal to the unique point size of the first same-point-size group;
    comparing a measure of children generation potential between the second chain fragment and the alternative chain fragment to generate a comparison result; and
    discarding the alternative chain fragment based on the comparison result.

* * * * *